US011216128B2

(12) United States Patent
Bao et al.

(10) Patent No.: US 11,216,128 B2
(45) Date of Patent: Jan. 4, 2022

(54) TOUCH-SENSING DISPLAY SUBSTRATE, TOUCH-SENSING DISPLAY APPARATUS, METHOD OF OPERATING TOUCH SENSING DISPLAY APPARATUS, AND METHOD OF FABRICATING TOUCH-SENSING DISPLAY SUBSTRATE

(71) Applicants: BEIJING BOE DISPLAY TECHNOLOGY CO., LTD., Beijing (CN); BOE Technology Group Co., Ltd., Beijing (CN)

(72) Inventors: Zhiying Bao, Beijing (CN); Shijun Wang, Beijing (CN); Haoliang Ji, Beijing (CN); Tianxin Zhao, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 38 days.

(21) Appl. No.: 16/638,437

(22) PCT Filed: Sep. 17, 2019

(86) PCT No.: PCT/CN2019/106241
§ 371 (c)(1),
(2) Date: Feb. 11, 2020

(87) PCT Pub. No.: WO2020/173082
PCT Pub. Date: Sep. 3, 2020

(65) Prior Publication Data
US 2021/0232265 A1 Jul. 29, 2021

(30) Foreign Application Priority Data
Feb. 26, 2019 (CN) .......................... 201910142492.0
Feb. 26, 2019 (CN) .......................... 201910143211.3

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01); *G06F 3/0446* (2019.05);
(Continued)

(58) Field of Classification Search
CPC . G06F 2203/04107; G06F 2203/04111; G06F 3/0412; G06F 3/04164; G06F 3/0443; G06F 3/0446; G06F 3/0448
(Continued)

(56) References Cited

U.S. PATENT DOCUMENTS

2012/0139866 A1* 6/2012 Jung ..................... H01L 27/124
345/174
2014/0104221 A1* 4/2014 Shen ..................... G06F 3/0443
345/174

(Continued)

FOREIGN PATENT DOCUMENTS

CN 103294312 A 9/2013
CN 104020893 A 9/2014
(Continued)

OTHER PUBLICATIONS

International Search Report & Written Opinion dated Dec. 20, 2019, regarding PCT/CN2019/106241.
(Continued)

*Primary Examiner* — Tony O Davis
(74) *Attorney, Agent, or Firm* — Intellectual Valley Law, P.C.

(57) ABSTRACT

A touch-sensing display substrate is provided. A plurality of first touch-sensing electrodes arranged along a first direction; a plurality of first apertures respectively extending through a thickness of a respective one of the plurality of
(Continued)

first touch-sensing electrodes; a plurality of second apertures respectively extending through of a thickness of the respective one of the plurality of first touch-sensing electrodes. A first signal line of the plurality of signal lines extends along the second direction and crosses over the plurality of first apertures in one of the plurality of first touch-sensing electrodes. A second signal line of the plurality of signal lines extends along the second direction and crosses over the plurality of second apertures in a same as or different from the one of the plurality of first touch-sensing electrodes crossed-over by the first signal line.

20 Claims, 20 Drawing Sheets

(52) U.S. Cl.
CPC ........ *G06F 3/0448* (2019.05); *G06F 3/04164* (2019.05); *G06F 2203/04107* (2013.01); *G06F 2203/04111* (2013.01)

(58) Field of Classification Search
USPC .................................................. 345/170–178
See application file for complete search history.

(56) References Cited

U.S. PATENT DOCUMENTS

| | | | |
|---|---|---|---|
| 2015/0153875 A1 | 6/2015 | Zhang | |
| 2015/0261348 A1 | 9/2015 | Jang et al. | |
| 2015/0378390 A1 | 12/2015 | Liu et al. | |
| 2016/0216802 A1 | 7/2016 | Bao et al. | |
| 2016/0274716 A1 | 9/2016 | Liu et al. | |
| 2016/0357312 A1 | 12/2016 | Li | |
| 2016/0370917 A1 | 12/2016 | Li et al. | |
| 2017/0269746 A1* | 9/2017 | He | G06F 3/0446 |
| 2019/0005923 A1 | 1/2019 | Kim et al. | |
| 2019/0113410 A1* | 4/2019 | Yoo | H01L 41/1132 |
| 2019/0265820 A1 | 8/2019 | Li | |
| 2020/0089037 A1* | 3/2020 | Yoshino | G02F 1/13338 |
| 2020/0089038 A1* | 3/2020 | Yoshino | G02F 1/136 |
| 2021/0117031 A1* | 4/2021 | Tominaga | G06F 3/0412 |

FOREIGN PATENT DOCUMENTS

| | | |
|---|---|---|
| CN | 104102402 A | 10/2014 |
| CN | 104503648 A | 4/2015 |
| CN | 104503650 A | 4/2015 |
| CN | 104571765 A | 4/2015 |
| CN | 104915078 A | 9/2015 |
| CN | 104965622 A | 10/2015 |
| CN | 205810812 U | 12/2016 |
| CN | 108319398 A | 7/2018 |
| CN | 109212839 A | 1/2019 |
| JP | 2015108896 A | 6/2015 |
| JP | 2017134340 A | 8/2017 |

OTHER PUBLICATIONS

First Office Action in the Chinese Patent Application No. 201910143211.3, dated Apr. 17, 2019; English translation attached.

* cited by examiner

TOUCH-SENSING DISPLAY SUBSTRATE, TOUCH-SENSING DISPLAY APPARATUS, METHOD OF OPERATING TOUCH SENSING DISPLAY APPARATUS, AND METHOD OF FABRICATING TOUCH-SENSING DISPLAY SUBSTRATE

CROSS-REFERENCE TO RELATED APPLICATION

This application is a national stage application under 35 U.S.C. § 371 of International Application No. PCT/CN2019/106241, filed Sep. 17, 2019, which claims priority to Chinese Patent Application No. 201910142492.0, filed Feb. 26, 2019, and Chinese Patent Application No. 201910143211.3, filed Feb. 26, 2019. Each of the forgoing applications is herein incorporated by reference in its entirety for all purposes.

TECHNICAL FIELD

The present invention relates to display technology, more particularly, to a touch-sensing display substrate, a touch-sensing display apparatus, a method of operating a touch sensing display apparatus, and a method of fabricating a touch-sensing display substrate.

BACKGROUND

Touch control display panels have found a wide range of applications in the display field such as mobile phones, computer display panels, touch screens, satellite navigation devices, and digital cameras. Touch control display panels can be categorized into three classes: add-on type touch panels, on-cell type touch panels, and in-cell type touch panels. Touch control display panels may be a self-capacitive type or a mutual capacitive type touch display panel. Touch control display panels may use mesh electrodes as the touch electrodes or use metal oxide materials (e.g., indium tin oxide) as the touch electrode material.

SUMMARY

In one aspect, the present invention provides a touch-sensing display substrate, comprising a plurality of first touch-sensing electrodes arranged along a first direction, a respective one of the plurality of first touch-sensing electrodes extending along a second direction different from the first direction; a plurality of first apertures respectively extending through a thickness of a respective one of the plurality of first touch-sensing electrodes, the plurality of first apertures arranged along the second direction; a plurality of second apertures respectively extending through of a thickness of the respective one of the plurality of first touch-sensing electrodes, the plurality of second apertures arranged along the second direction; and a plurality of signal lines; wherein a first signal line of the plurality of signal lines extends along the second direction and crosses over the plurality of first apertures in one of the plurality of first touch-sensing electrodes but not the plurality of second apertures in any first touch-sensing electrode; and a second signal line of the plurality of signal lines extends along the second direction and crosses over the plurality of second apertures in a same as or different from the one of the plurality of first touch-sensing electrodes crossed-over by the first signal line, but not the plurality of first apertures in any first touch-sensing electrode.

Optionally, the first signal line and the second signal line are configured to transmit signals of a same type.

Optionally, a total length of portions of the first signal line crossing over the plurality of first apertures is substantially same as a total length of portions of the second signal line crossing over the plurality of second apertures.

Optionally, a respective first aperture of the plurality of first apertures and a respective second aperture of the plurality of second apertures are arranged along the first direction; and a length of a portion of the first signal line crossing over the respective first aperture is substantially same as a length of a portion of the second signal line crossing over the respective second aperture.

Optionally, the first signal line respectively crosses over each of the plurality of first apertures by a substantially same first length; the second signal line respectively crosses over each of the plurality of second apertures by a substantially same second length; and the substantially same first length and the substantially same second length are substantially same.

Optionally, the plurality of signal lines are configured to transmit signals of a same type; each of substantially all of the plurality of signal lines crosses over multiple apertures in one of the plurality of first touch-sensing electrodes; wherein substantially all of the plurality of signal lines comprise a first group of signal lines and a second group of signal lines; a respective one of the first group of signal lines crosses over multiple first apertures of the plurality of first apertures in a corresponding one of the plurality of first touch-sensing electrodes; a respective one of the second group of signal lines crosses over multiple second apertures of the plurality of second apertures in a corresponding one of the plurality of first touch-sensing electrodes.

Optionally, the touch-sensing display substrate further comprises a plurality of second touch-sensing electrodes arranged along the second direction and crossing over the plurality of first touch-sensing electrodes; and a plurality of second touch-sensing signal lines arranged along the second direction; wherein a respective one of the plurality of second touch-sensing electrodes comprises a plurality of second touch-sensing sub-electrodes; one of the plurality of second touch-sensing sub-electrodes of the respective one of the plurality of second touch-sensing electrodes is in a region corresponding to one of the plurality of first apertures corresponding to the respective one of the plurality of first touch-sensing electrodes; and the respective one of the plurality of second touch-sensing signal lines connects a column of second touch-sensing sub-electrodes of the plurality of second touch-sensing sub-electrodes in the respective one of the plurality of second touch-sensing electrodes.

Optionally, the touch-sensing display substrate further comprises a plurality of first connecting lines arranged along the first direction and disposed in an inter-subpixel region of the touch-sensing display substrate; wherein a respective one of the plurality of first connecting lines extends along the second direction and is electrically connected to a corresponding first touch-sensing electrode.

Optionally, the plurality of first connecting lines are parallel to a plurality of gate lines; and the plurality of first connecting lines and the plurality of gate lines are in a same layer and comprise a same material.

Optionally, the touch-sensing display substrate further comprises a plurality of second connecting lines arranged along the second direction and disposed in an inter-subpixel region of the touch-sensing display substrate; wherein the respective one of the plurality of first touch-sensing electrodes is electrically connected to the plurality of second connecting lines.

Optionally, the plurality of second connecting lines are parallel to a plurality of data lines; and the plurality of second connecting lines and the plurality of data lines are in a same layer and comprise a same material.

Optionally, the touch-sensing display substrate further comprises a plurality of first connecting lines arranged along the first direction and disposed in an inter-subpixel region of the touch-sensing display substrate; and a plurality of second connecting lines arranged along the second direction and disposed in the inter-subpixel region of the touch-sensing display substrate; wherein a respective one of the plurality of first connecting lines extends along the second direction and is electrically connected to the respective one of the plurality of first touch-sensing electrodes; the respective one of the plurality of first touch-sensing electrodes is electrically connected to the plurality of second connecting lines; the plurality of first connecting lines are parallel to a plurality of gate lines; the plurality of second connecting lines are parallel to a plurality of data lines; the touch-sensing display substrate further comprises a first insulating layer between the plurality of gate lines and the plurality of data lines; wherein a respective one of the plurality of second connecting lines extend through the first insulating layer and electrically connects to ends of at least one of the plurality of first connecting lines; an orthographic projection of the respective one of the plurality of first touch-sensing electrodes on a base substrate at least partially overlaps with an orthographic projection of the at least one of the plurality of first connecting lines electrically connected to the respective one of the plurality of second connecting lines on the base substrate.

Optionally, the touch-sensing display substrate further comprises a second insulating layer between the plurality of data lines and the plurality of first touch-sensing electrodes; wherein the plurality of second connecting lines respectively extend through the second insulating layer to electrically connect to the plurality of first touch-sensing electrodes.

Optionally, the touch-sensing display substrate further comprises a second insulating layer between the plurality of gate lines and the plurality of first touch-sensing electrodes; wherein the plurality of first connecting lines respectively extend through the second insulating layer to electrically connect to the plurality of first touch-sensing electrodes.

Optionally, multiple lines of the plurality of first connecting lines are electrically connected in parallel to each other; and multiple lines of the plurality of second connecting lines are electrically connected in parallel to each other.

Optionally, the touch-sensing display substrate further comprises a plurality of first touch-sensing signal lines arranged along the second direction; and a plurality of second touch-sensing signal lines arranged along the second direction; wherein a respective one of the plurality of first touch-sensing signal lines and a respective one of the plurality of second touch-sensing signal lines extend along the first direction.

Optionally, the plurality of second touch-sensing sub-electrodes are arranged in array.

Optionally, the plurality of first touch-sensing electrodes and the plurality of second touch-sensing electrodes are in a same layer and comprise a same material.

Optionally, the plurality of signal lines are gate lines or data lines.

In another aspect, the present disclosure provides a touch-sensing display apparatus, comprising a touch-sensing display substrate described herein, and one or more integrated circuits connected to the touch-sensing display substrate.

Optionally, the touch-sensing display apparatus is operated in a time division mode comprising a display mode and a touch control mode; wherein, in the display mode, the plurality of first touch-sensing electrodes are used as a common electrode and are configured to be provided with a common voltage; wherein, in the touch control mode, the plurality of first touch-sensing electrodes are a plurality of touch sensing electrodes configured to transmit touch signals.

In another aspect, the present disclosure provides a method of operating a touch sensing display apparatus, comprising operating a touch sensing display apparatus of claim 20 in a time division mode comprising a display mode and a touch control mode; in the display mode, applying a common voltage to a plurality of first touch-sensing electrodes arranged along a first direction; in the touch control mode; transmitting touch signals using the plurality of first touch-sensing electrodes.

In another aspect, the present disclosure provides a method of fabricating a touch-sensing display substrate, comprising forming a plurality of first touch-sensing electrodes arranged along a first direction; a respective one of the plurality of first touch-sensing electrodes extending along a second direction different from the first direction; forming a plurality of first apertures respectively extending through a thickness of a respective one of the plurality of first touch-sensing electrodes, the plurality of first apertures arranged along the second direction; a plurality of second apertures respectively extending through of a thickness of the respective one of the plurality of first touch-sensing electrodes, the plurality of second apertures arranged along the second direction; and forming a plurality of signal lines; wherein a first signal line of the plurality of signal lines is formed to extend along the second direction and crosses over the plurality of first apertures in one of the plurality of first touch-sensing electrodes but not the plurality of second apertures in any first touch-sensing electrode; and a second signal line of the plurality of signal lines is formed to extend along the second direction and crosses over the plurality of second apertures in a same as or different from the one of the plurality of first touch-sensing electrodes crossed-over by the first signal line, hut not the plurality of first apertures in any first touch-sensing electrode.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter aha, a touch-sensing display substrate, a touch-sensing display apparatus, a method of operating a touch sensing display apparatus, and a method of fabricating a touch-sensing display substrate that substantially obviate one or more of the problems due to limitations and disadvantages of the related art. In one aspect, the present disclosure provides a touch-sensing display substrate. In some embodiments, the touch-sensing display substrate includes a plurality of first touch-sensing electrodes arranged along a first direction, a respective one of the plurality of first touch-sensing electrodes extending along a second direction different from the first direction; a plurality of first apertures respectively extending through a thickness of a respective one of the plurality of first touch-sensing electrodes, the plurality of first apertures arranged along the second direction; a plurality of second apertures respectively extending through of a thickness of the respective one of the plurality of first touch-sensing electrodes, the plurality of second apertures arranged along the second direction; and a plurality of signal lines. Optionally, a first signal line of the plurality of signal lines extends along the second direction and crosses over the plurality of first apertures in one of the plurality of first touch-sensing electrodes but not the plurality of second apertures in any first touch-sensing electrode. Optionally, a second signal line of the plurality of signal lines extends along the second direction and crosses over the plurality of second apertures in a same as or different from the one of the plurality of first touch-sensing electrodes crossed-over by the first signal line, but not the plurality of first apertures in any first touch-sensing electrode.

In order to obviate the issue of insufficient charging time of data lines in a display apparatus having high resolution and to let the display apparatus be compatible with an active pen, a touch-sensing display substrate which performs a touch control function and a display function at the same time is provided.

Figure 1:
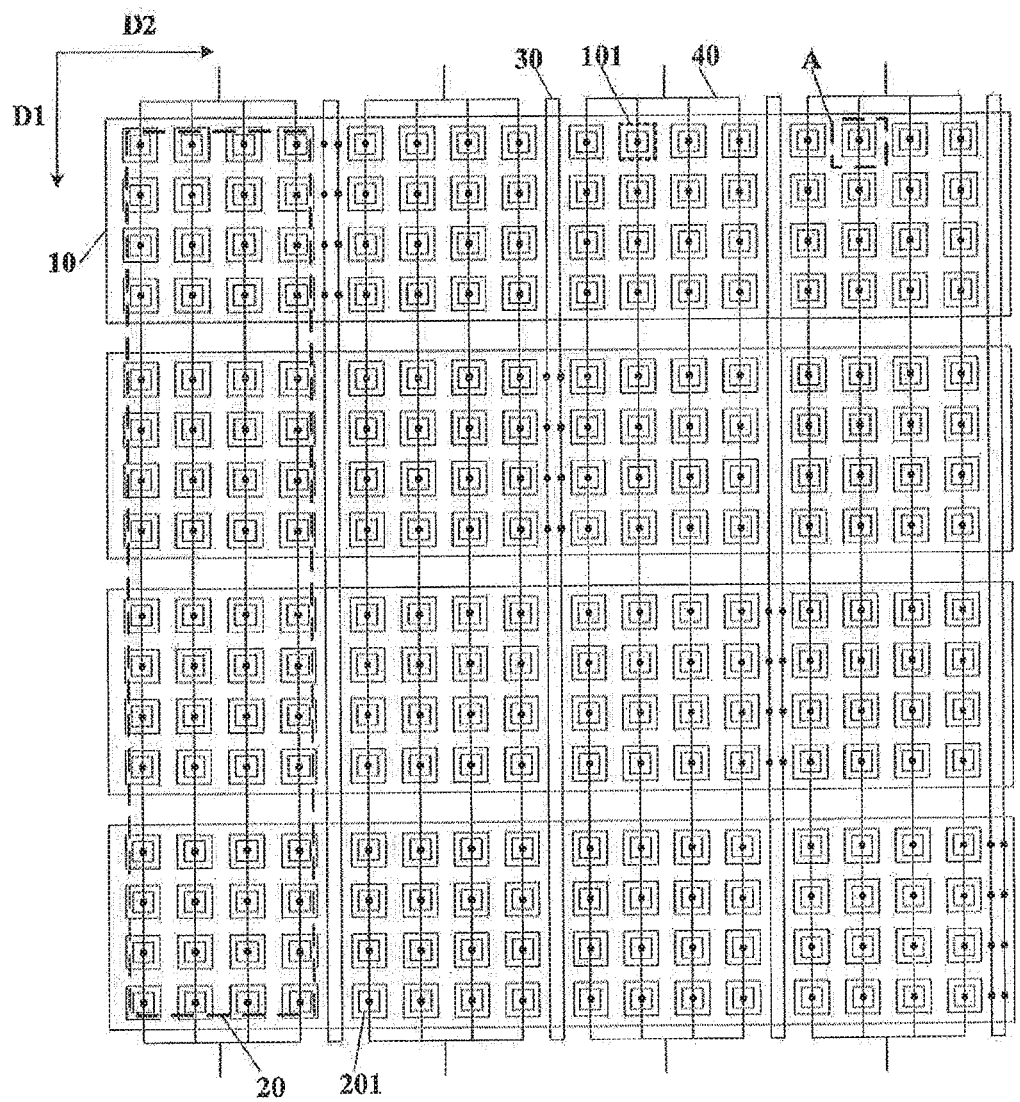
FIG. 1 is a schematic diagram of a structure of a touch-sensing display substrate in some embodiments according to the present disclosure.

FIG. 1 is a schematic diagram of a structure of a touch-sensing display substrate in some embodiments according to the present disclosure. Referring to FIG. 1, in some embodiment, the touch-sensing display substrate includes a plurality of first touch-sensing electrodes 10 arranged along a first direction D1. Optionally, a respective one of the plurality of first touch-sensing electrodes 10 extends along a second direction D2 different from the first direction D1.

In some embodiments, the touch-sensing display substrate further includes a plurality of first apertures 101 respectively extending through a thickness of a respective one of the plurality of first touch-sensing electrodes 10. Optionally, the plurality of first apertures 101 are arranged along the second direction D2.

In some embodiments, the touch-sensing display substrate further includes a plurality of second touch-sensing electrodes 20 crossing over the plurality of first touch-sensing electrodes 10. Optionally, the plurality of second touch-sensing electrodes 20 are arranged along the second direction D2. Optionally, a respective one of the plurality of second touch-sensing electrodes 20 extends along the first direction.

Optionally, the respective one of the plurality of second touch-sensing electrodes 20 includes a plurality of second touch-sensing sub-electrodes 201. Optionally, one of the plurality of second touch-sensing sub-electrodes 201 of the respective one of the plurality of second touch-sensing electrodes 20 is in a region corresponding to one of the plurality of first apertures 101 in the respective one of the plurality of first touch-sensing electrodes 10.

For example, the plurality of first apertures 101 extending through the respective one of the plurality of first touch-sensing electrodes 10 are arranged in multiple rows. The plurality of second touch-sensing sub-electrodes 201 in the respective one of the plurality of second touch-sensing electrodes 20 are arranged in multiple columns. In a region where multiple row regions corresponding to the plurality of first apertures 101 overlaps with the multiple column regions corresponding to the plurality of second touch-sensing sub-electrodes 201, a respective second touch-sensing sub-electrodes 201 is in a region corresponding to a respective first apertures 101.

The plurality of first apertures 101 extend through the respective one of the plurality of first touch-sensing electrodes 10. When signal lines cross over the respective one of the plurality of first touch-sensing electrodes 10 along the first direction D1 or along the second direction D2, some signal lines may extends through regions corresponding to the plurality of first apertures 101 whereas some other signal lines may extends through regions without the plurality of first apertures 101. The signal lines are electrically coupled with the respective one of the plurality of first touch-sensing electrodes 10. Coupling areas of the respective one of the plurality of first touch-sensing electrodes 10 respectively with different signal lines in different positions, however, may be different due to the presence or absence of the plurality of first apertures 101. This difference in turn may lead to different coupling strength of signal coupling induced by signals in different signal lines with respect to the respective one of the plurality of first touch-sensing electrodes 10.

Figure 2:
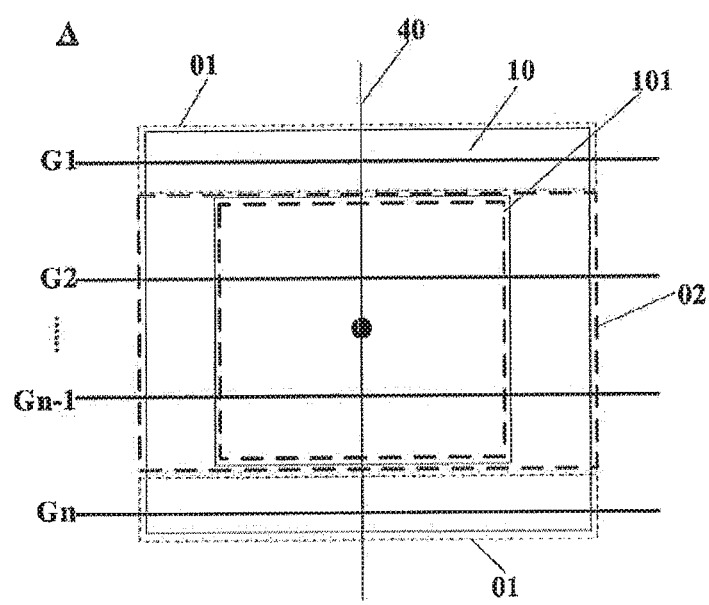
FIG. 2 is a zoom-in view of an area. A in FIG. 1.

FIG. 2 is a zoom-in view of an area A in FIG. 1 showing a partial structure of a respective one of the plurality of first touch-sensing electrodes 10. In some embodiments, referring to FIG. 2, optionally, the signal lines are gate lines. The respective one of the plurality of first touch-sensing electrodes 10 is electrically coupled with the gate lines from G1 to Gn. An area of the respective one of the plurality of first touch-sensing electrodes 10 electrically coupled with the G1 gate line or Gn gate line is greater than an area of the respective one of the plurality of first touch-sensing electrodes 10 electrically coupled with one of gate lines from G2 to G(n−1). When signals are applied to the gate lines (e.g., G1 to Gn) line-by-line, an voltage of a portion of the respective one of the plurality of first touch-sensing electrodes 10 in region 01 is different from an voltage of a portion of the respective one of the plurality of first touch-sensing electrodes 10 in region 02.

For example, when the plurality of first touch-sensing electrodes 10 and the plurality of second touch-sensing electrodes 20 function as a common electrode when the touch-sensing display substrate is performing a display function, the voltage of the portion of the respective one of the plurality of first touch-sensing electrodes 10 in region 01 is different from the voltage of the portion of the respective one of the plurality of first touch-sensing electrodes 10 in region 02, so, a voltage of a pixel in region 01 is different from a voltage of a pixel in region 02, which may leads to equidistant horizontal stripes displayed by the display apparatus.

Figure 3A:
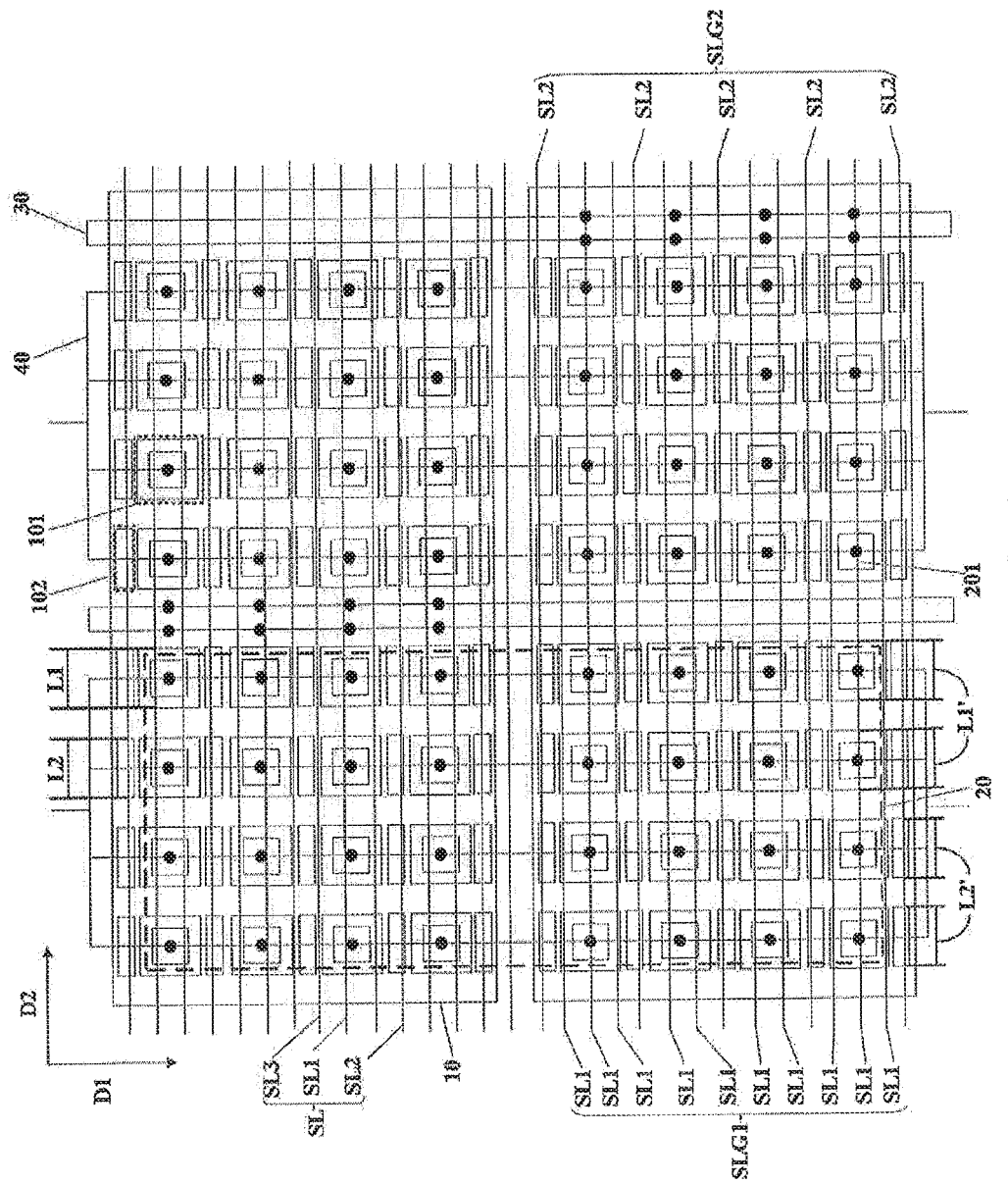
FIG. 3A is a schematic diagram of a structure of a touch-sensing display substrate in some embodiments according to the present disclosure.
Figure 3B:
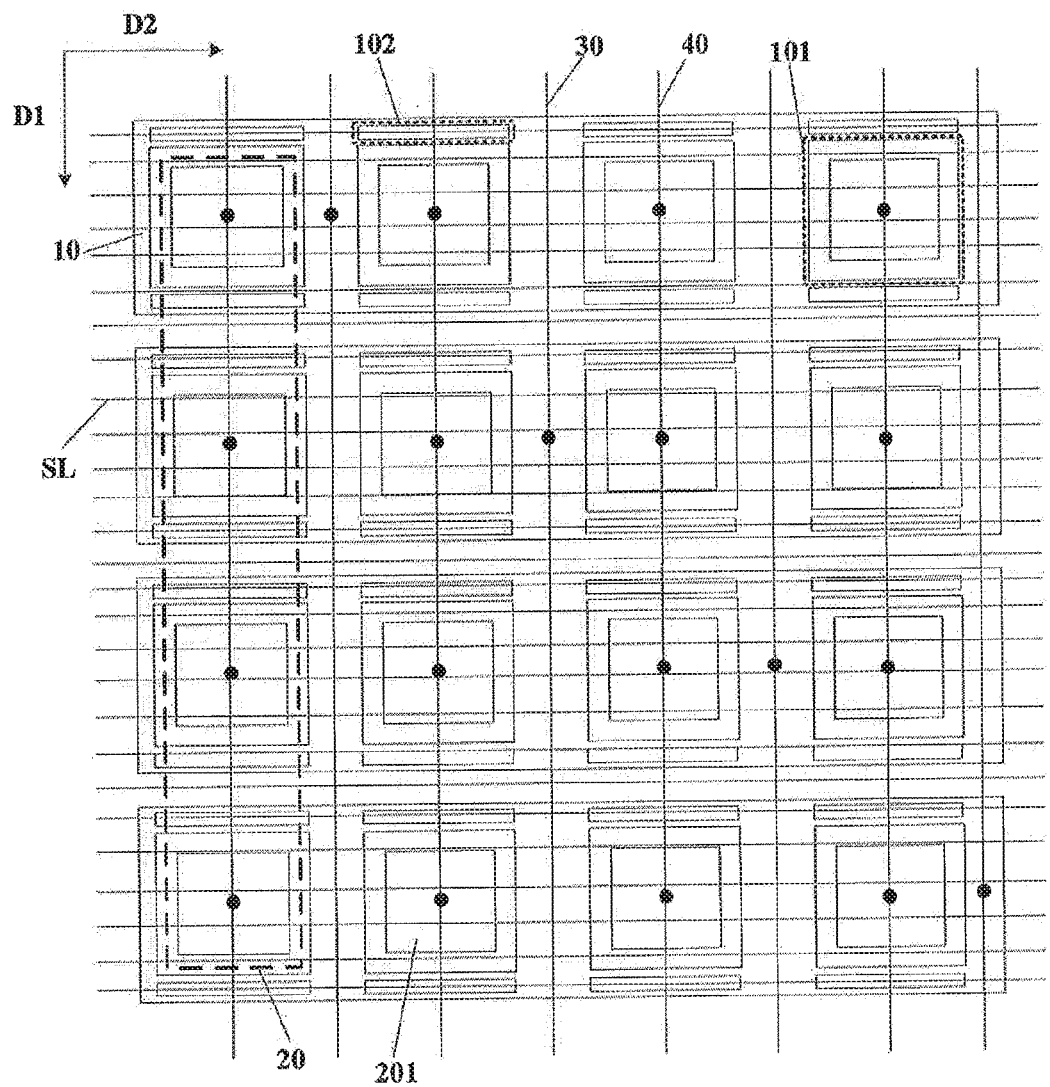
FIG. 3B is a schematic diagram of a structure of a touch-sensing display substrate in some embodiments according to the present disclosure.

FIG. 3A is a schematic diagram of a structure of a touch-sensing display substrate in some embodiments according to the present disclosure. FIG. 3B is a schematic diagram of a structure of a touch-sensing display substrate in some embodiments according to the present disclosure. In some embodiments, referring to FIG. 3A and FIG. 3B, the touch-sensing display substrate includes a plurality of first touch-sensing electrodes 10 arranged along a first direction D1. Optionally, a respective one of the plurality of first touch-sensing electrodes 10 extends along a second direction D2 different from the first direction D1.

In some embodiments, the touch-sensing display substrate further includes a plurality of first apertures 101 respectively extending through a thickness of a respective one of the plurality of first touch-sensing electrodes 10. Optionally, the plurality of first apertures 101 are arranged along the second direction D2.

In some embodiments, the touch-sensing display substrate further includes a plurality of second touch-sensing electrodes 20 crossing over the plurality of first touch-sensing electrodes 10. Optionally, the plurality of second touch-sensing electrodes 20 are arranged along the second direction D2. Optionally, a respective one of the plurality of second touch-sensing electrodes 20 extends along the first direction.

Optionally, the respective one of the plurality of second touch-sensing electrodes 20 includes a plurality of second touch-sensing sub-electrodes 201. Optionally, one of the plurality of second touch-sensing sub-electrodes 201 of the respective one of the plurality of second touch-sensing electrodes 20 is in a region corresponding to one of the plurality of first apertures 101 corresponding to the respective one of the plurality of first touch-sensing electrodes 10.

In some embodiments, the touch-sensing display substrate further includes a plurality of second apertures 102, respectively extending through of a thickness of the respective one of the plurality of first touch-sensing electrodes 10. Optionally, the plurality of second apertures 102 are arranged along the second direction D2.

In some embodiments, the touch-sensing display substrate further includes a plurality of signal lines SL. Optionally, the plurality of signal lines SL include a first signal line SU and a second signal line SL2. Optionally, the first signal line SL1 of the plurality of signal lines SL extends along the second direction D1 and crosses over the plurality of first apertures 101 in one of the plurality of first touch-sensing electrodes 10 but not the plurality of second apertures 102 in any first touch-sensing electrode. Optionally, the second signal line SL2 of the plurality of signal lines extends along the second direction D2 and crosses over the plurality of second apertures 102 in a same as or different from the one of the plurality of first touch-sensing electrodes 10 crossed-over by the first signal line, but not the plurality of first apertures 101 in any first touch-sensing electrode. For example, a respective one of the plurality of signal lines SL cannot cross over both one of the plurality of first apertures 101 and one of the plurality of second apertures 102.

Optionally, the plurality of signal lines SL are gate lines or data lines. Optionally, the first signal line and the second signal line are configured to transmit signals of a same type.

Optionally, the plurality of signal lines SL further includes a third signal lines SL3 extending along the second direction D1 without crossing over any one of the plurality of first apertures 101 and any one of the plurality of second apertures 102.

Optionally, the respective one of the plurality of first touch-sensing electrodes 10 is a transmitting (TX) electrode (e.g., a scanning electrode), and the respective one of the plurality of second touch-sensing electrodes 20 is a receiving (RX) electrode (e.g., a sensing electrode). Optionally, the respective one of the plurality of second touch-sensing electrodes 20 is a transmitting (TX) electrode, and the respective one of the plurality of first touch-sensing electrodes 10 is a receiving (RX) electrode.

Referring to FIG. 3A, in one example, the plurality of first apertures 101 extending through the respective one of the plurality of first touch-sensing electrodes 10 are arranged in multiple rows. The plurality of second touch-sensing sub-electrodes 201 in the respective one of the plurality of second touch-sensing electrodes 20 are arranged in multiple columns. In a region where multiple row regions corresponding to the plurality of first apertures 101 overlaps with the multiple column regions corresponding to the plurality of second touch-sensing sub-electrodes 201, there are multiple first apertures and multiple second touch-sensing sub-electrodes, and a respective second touch-sensing sub-electrodes 201 is in a region corresponding to a respective first apertures 101. The multiple second touch-sensing sub-electrodes increase a perimeter of the respective one of the plurality of the second touch-sensing electrodes 20, so, perimeters of the multiple second touch-sensing sub-electrodes electrically coupled with the respective one of the plurality of first touch-sensing electrodes 10 are increased, which also increases fringe field capacitance between the respective one of the plurality of first touch-sensing electrodes 10 and the respective one of the plurality of second touch-sensing electrodes 20.

For example, in the region where multiple row regions corresponding to the plurality of first apertures 101 overlaps with the multiple column regions corresponding to the plurality of second touch-sensing sub-electrodes 201, there are multiple first apertures arranged in an array having a size of M×N, and multiple second touch-sensing sub-electrodes arranged in an array having a size of M×N, wherein M and N are positive integers, M≥2, and N≥2.

Referring to FIG. 3B, in another example, the plurality of first apertures 101 are arranged in one row. The plurality of second touch-sensing sub-electrodes 201 are arranged in one column. In a region where a row region corresponding to the plurality of first apertures 101 overlaps with a column region corresponding to the plurality of second touch-sensing sub-electrodes 201, there are one first aperture and one second touch-sensing sub-electrodes, and a respective second touch-sensing sub-electrodes 201 is in a region corresponding to a respective first apertures 101.

In some embodiment, referring to FIG. 3A, each of substantially all of the plurality of signal lines SL crosses over multiple apertures in one of the plurality of first touch-sensing electrodes 10. Optionally, substantially all of the plurality of signal lines includes a first group of signal lines SLG1 and a second group of signal lines SLG2. Optionally, a respective one of the first group of signal lines SLG1 crosses over multiple first apertures of the plurality of first apertures 101 in a corresponding one of the plurality of first touch-sensing electrodes 10. Optionally, a respective one of the second group of signal lines SLG2 crosses over multiple second apertures of the plurality of second apertures 102 in a corresponding one of the plurality of first touch-sensing electrodes 10.

As used herein, the term "substantially all" refers to a value which is at least 80%, e.g., at least 80%, at least 85%, at least 90%, at least 95%, at least 99%, and 100%.

Optionally, the first group of signal lines SLG1 includes the first signal line SL1. Optionally, the second group of signal lines SLG2 includes the second signal line SL2.

Optionally, the plurality of signal lines SL do not includes any third signal line SLS, for example, a respective one of the all of the plurality of signal lines crosses over multiple first apertures of the plurality of first apertures 101 in a corresponding one of the plurality of first touch-sensing electrodes, or crosses over multiple second apertures of the plurality of second apertures in a corresponding one of the plurality of first touch-sensing electrodes. Because a number of third signal lines is far more less than a number of the first signal lines and less than a number of the second signal lines, and a difference, between a signal coupling of one third signal line and one of the plurality of first touch-sensing electrodes and a signal coupling of one first or second signal line and one of the plurality of first touch-sensing electrodes, is greater than a difference, between a signal coupling of one first signal line and one of the plurality of first touch-sensing electrodes and a signal coupling of one second signal line and one of the plurality of first touch-sensing electrode, it is better that each signal line crosses over the plurality of first apertures 101 or the plurality of second apertures 102.

Because the touch-sensing display substrate is absent of any aperture extending through the respective one of the plurality of second touch-sensing electrodes 20, different signal lines in different position may have a same electrical coupling area with respect to different second touch-sensing electrodes 20. Accordingly, coupling areas of the respective one of the plurality of second touch-sensing electrodes 20 respectively with different signal lines in different position are substantially the same; and coupling strength of signal coupling induced by signals in the different signal lines with respect to different second touch-sensing electrodes 20 is substantially the same.

In some embodiments, the plurality of first touch-sensing electrodes 10 and the plurality of second touch-sensing electrodes 20 can be used as a common electrode. So, the plurality of first touch-sensing electrodes 10 and the plurality of second touch-sensing electrodes 20 can be used to perform either the touch-control function or the display function. Moreover, the touch-control function and the display function can be performed at the same time, which can obviate the issue of insufficient charging time of data lines in a display apparatus having high resolution and to let the display apparatus compatible with an active pen. Also, comparing with display substrate having both the common electrode and the touch-sensing electrodes, the touch-sensing display substrate described herein, using the touch-sensing electrodes as the common electrode, can be thinner.

In some embodiments, the plurality of first touch-sensing electrodes 10 and the plurality of second touch-sensing electrodes 20 are in a same layer and includes a same material. So, the plurality of first touch-sensing electrodes 10 and the plurality of second touch-sensing electrodes 20 can be formed in a same process, which can simplify the process of fabricating the touch-sensing display substrate.

Various appropriate electrode materials and various appropriate fabricating methods may be used to make the plurality of first touch-sensing electrodes and the plurality of second touch-sensing electrodes. Examples of appropriate electrode materials for making the plurality of first touch-sensing electrodes and the plurality of second touch-sensing electrodes include, but are not limited to, Indium Tin Oxide (ITO), and Indium Zinc Oxide (IZO).

Because voltages applied to the plurality of gate lines are greater than voltages applied to the plurality of data lines, difference gate lines having different signal couplings with respect to the respective one of the plurality of first touch-sensing electrodes, and different data lines having different signal couplings with respect to the respective one of the plurality of first touch-sensing electrodes, differences between difference signal couplings between the gate lines and the respective one of the plurality of first touch-sensing electrodes are greater than differences between difference signal couplings between the data lines and the respective one of the plurality of first touch-sensing electrodes. The difference may lead to different signal couplings between signals in different signal lines and the corresponding first touch-sensing electrodes.

Referring to FIG. 3A, since the first signal line SL1 of the plurality of signal lines SL crosses over the plurality of first apertures 101 in one of the plurality of first touch-sensing electrodes, and the second signal line SL2 of the plurality of signal lines SL crosses over the plurality of second apertures 102 in a same as or different from the one of the plurality of first touch-sensing electrodes crossed-over by the first signal line. The difference between a signal coupling, between the first signal line SL1 and the one of the plurality of first touch-sensing electrodes, and a signal coupling, between the second signal line SL2 and the one of the plurality of first touch-sensing electrodes (or a different one of the plurality of first touch-sensing electrode), is decreased due to the presence of the plurality of second apertures 102. So, when the plurality of first touch-sensing electrodes 10 and the plurality of second touch-sensing electrodes 20 are used as a common electrodes, the signal coupling difference between different regions of the touch-sensing display substrate is reduced, which can avoid equidistant horizontal stripes displayed by the touch-sensing display substrate.

In some embodiments, a total length of portions of the first signal line SL1 crossing over the plurality of first apertures 101 is different from a total length of portions of the second signal line SL2 crossing over the plurality of second apertures 102.

In some embodiments, a total length of portions of the first signal line SL1 crossing over the plurality of first apertures 101 is substantially the same as a total length of portions of the second signal line SL2 crossing over the plurality of second apertures 102.

As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value.

Optionally, a length L1 of a portion of the first signal line SL1 crossing over one of the plurality of first apertures 101 is different from a length L2 of a portion of the second signal line SL2 crossing over the one of the plurality of second apertures 102.

Optionally, a length L1 of a portion of the first signal line SL1 crossing over one of the plurality of first apertures 101 is substantially same as a length L2 of a portion of the second signal line SL2 crossing over the one of the plurality of second apertures 102.

In some embodiments, a respective first aperture of the plurality of first apertures 101 and a respective second aperture of the plurality of second apertures 102 are arranged along the first direction D1. Because, the length L1 of a portion of the first signal line SL1 crossing over the respective first aperture is substantially same as the length L2 of a portion of the second signal line SL2 crossing over the respective second aperture, the portion of the first signal line SL1 crossing over the respective first aperture will have a signal coupling with respect to a portion of the respective first electrode surrounding the respective first aperture is substantially same as a signal coupling between the portion of the second signal lines SL2 crossing over the respective second aperture and a portion of the respective first electrode surrounding the respective second aperture.

Optionally, the first signal line SL1 respectively crosses over each of the plurality of first apertures 101 by a substantially same first length L1'. Optionally, the second signal line SL2 respectively crosses over each of the plurality of second apertures 102 by a substantially same second length L2'. Optionally, the substantially same first length L1' and the substantially same second length L2' are substantially same. So, the first signal line SL1 crossing over the respective first aperture will have a signal coupling with respect to the respective first electrode is substantially same as a signal coupling between the second sianal lines SL2 and the respective first electrode, which ensures an uniformity of signal couplings between the plurality of first touch-sensing electrodes 10 and the plurality of signal lines, and avoid equidistant horizontal stripes to improve the display quality.

As an area of the respective one of the plurality of first touch-sensing electrodes 10 becomes smaller, a resistance of the respective one of the plurality of first touch-sensing electrodes 10 becomes greater. If a difference between the resistance of the respective one of the plurality of first touch-sensing electrodes and a resistance of the respective one of the plurality of second touch-sensing electrodes 20 increases, a load difference between the respective one of the plurality of first touch-sensing electrodes 10 and the respective one of the plurality of second touch-sensing electrodes 20 will increase, so when the plurality of first touch-sensing electrodes 10 and the plurality of second touch-sensing electrodes 20 are used as a common electrode, brightnesses of subpixels corresponding to the plurality of first touch-sensing electrodes 10 are different from brightnesses of subpixels corresponding to the plurality of second touch-sensing electrodes 20.

Figure 4:
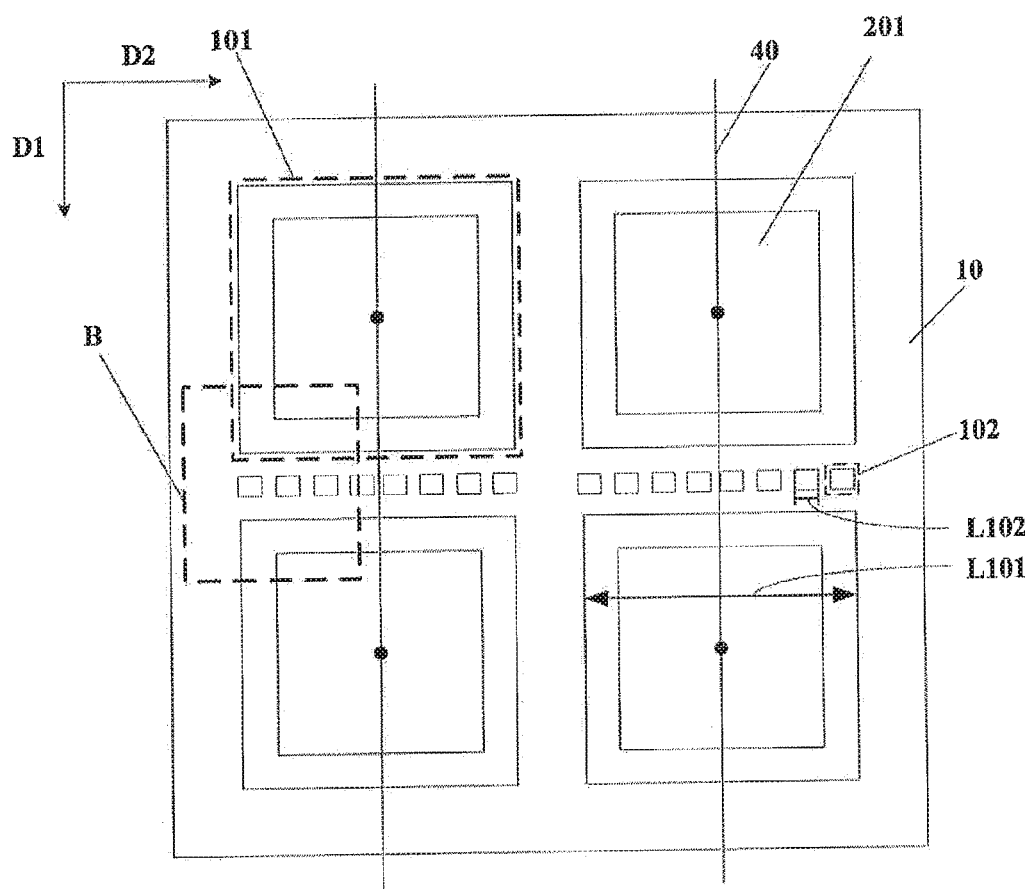
FIG. 4 is a schematic diagram of a structure of a touch-sensing display substrate in some embodiments according to the present disclosure.
Figure 5:
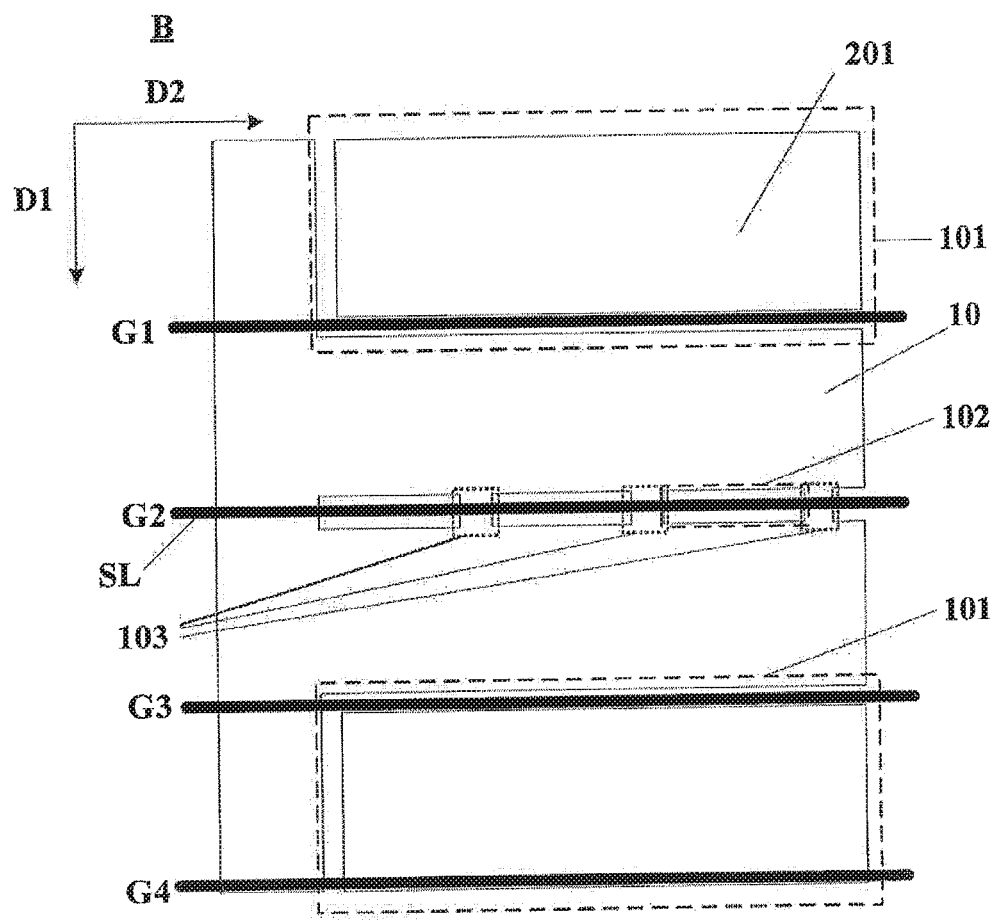
FIG. 5 is a zoom-in view of an area B in FIG. 4.

FIG. 4 is a schematic diagram of a structure of a touch-sensing display substrate in some embodiments according to the present disclosure. FIG. 5 is a zoom-in view of an area B in FIG. 4. Referring to FIG. 4 and FIG. 5, in order to avoid the issue of a high electrical resistance of the respective one of the plurality of first touch-sensing electrodes 10 due to a relatively small area of the respective one of the plurality of first touch-sensing electrodes 10, a length L102, along a second direction D2, of one of the plurality of second apertures 102 between two adjacent first apertures is smaller than lengths L101, along the second direction D2, of the two adjacent first apertures. Instead, referring to FIG. 4, in portion B of the respective one of the plurality of first touch-sensing electrodes, multiple second apertures are formed between the two adjacent first apertures. For example, total length along the second direction D2 of the multiple second apertures between the two adjacent first apertures is substantially same at the lengths along the second direction D2 of the two adjacent first aperture. In some embodiments, referring to FIG. 5, along the second direction D2, one of a plurality of connecting blocks 103 is between two adjacent second apertures. Arrangements of the plurality of second apertures in FIG. 4 and FIG. 5 ensure that the area of the respective one of the plurality of first touch-sensing electrodes 10 will not be too small to have a relatively small electrical resistance.

Referring to FIG. 5, due to the plurality of connecting blocks 103, a total length of portions of the signal line G2 crossing over corresponding second apertures is different from a total length of portions of the signal line G1 (or signal line G3, or signal line G4) crossing over a corresponding first apertures 101, which leads to signal coupling difference between the portion of the respective first touch-sensing electrode corresponding to the signal line G2 and the portion of the respective first touch-sensing electrode corresponding to the signal line G1 (or signal line G3, or signal line (14).

Figure 6:
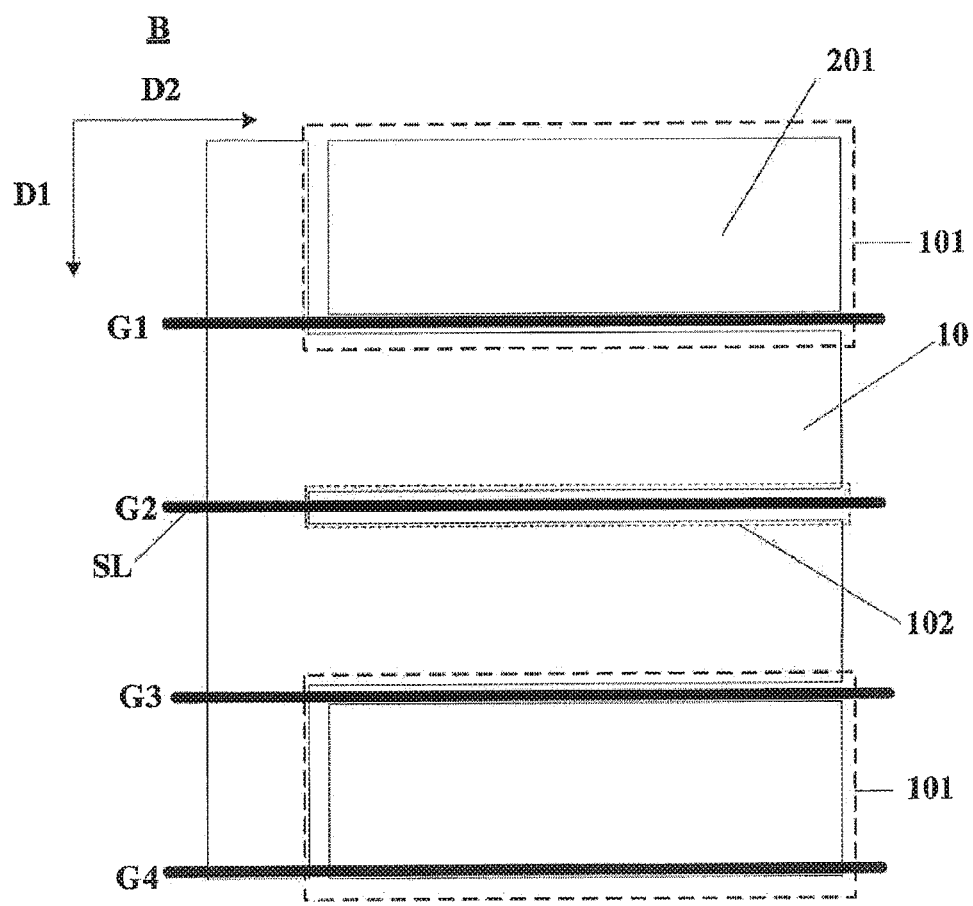
FIG. 6 is a zoom-in view of an area B in FIG. 4.

FIG. 6 is a zoom-in view of an area B in FIG. 4. Referring to FIG. 6, in some embodiments, a total length of portions of the signal line G2 crossing over corresponding second apertures is substantially same as a total length of portions of the signal line G1, which means that the second apertures between the two adjacent first apertures has a length along the second direction D2 substantially same as lengths of the two adjacent first apertures along the second direction, so signal coupling on the portion of the respective first touch-sensing electrode corresponding to the signal line G2 and the portion of the respective first touch-sensing electrode corresponding to the signal line G1 (or signal line G3, or signal line G4) are substantially same.

Figure 7:
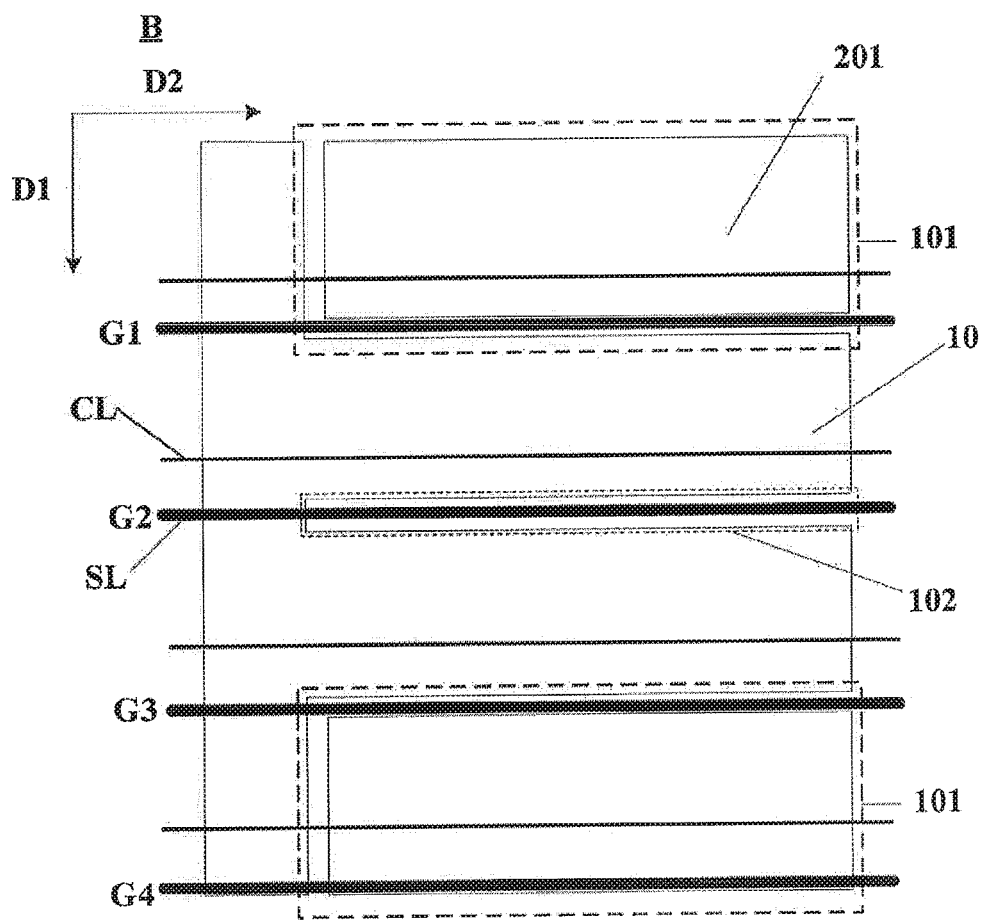
FIG. 7 is a zoom-in view of an area B in FIG. 4.
Figure 8:
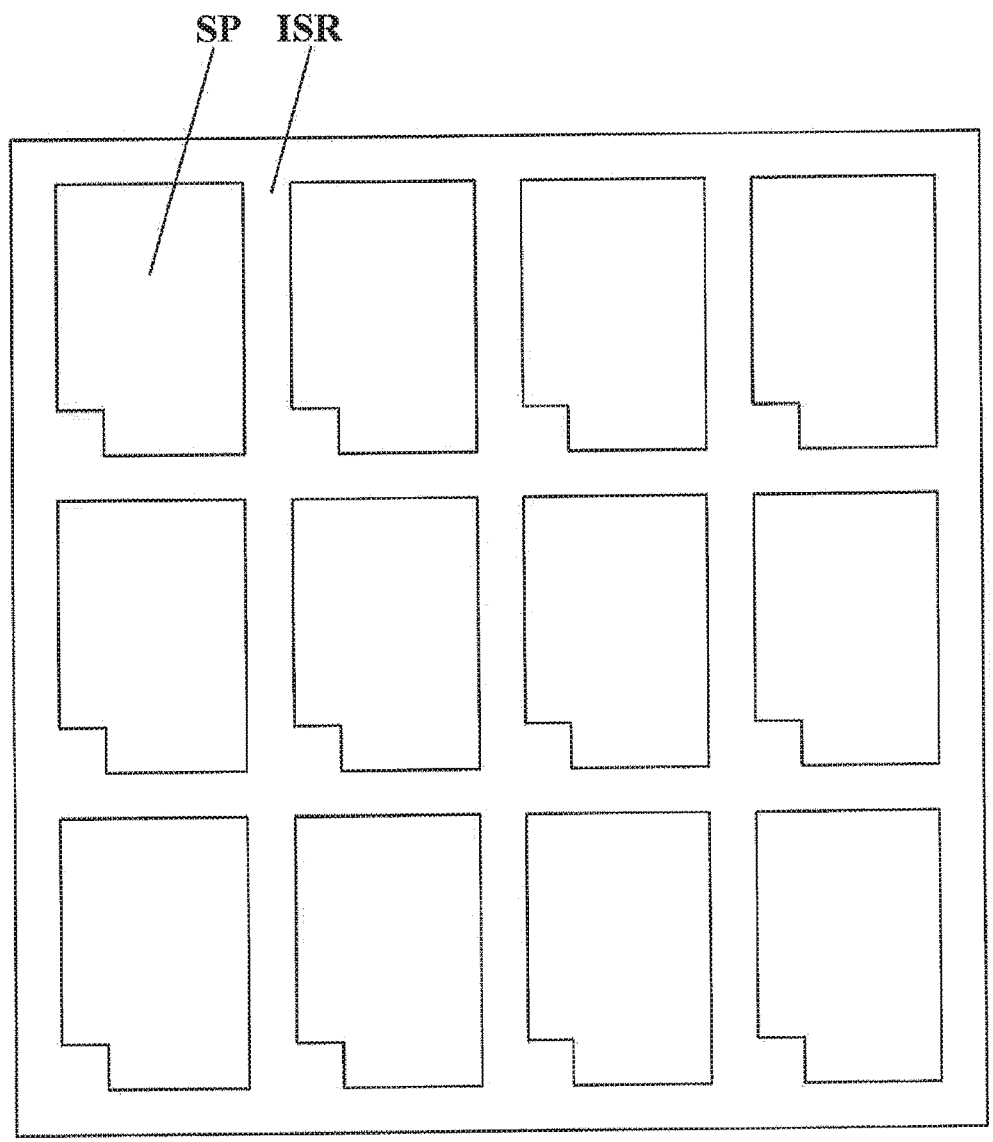
FIG. 8 is a schematic diagram of a plurality of subpixel regions and an inter-subpixel region of a touch-sensing display substrate in some embodiments according to the present disclosure.

FIG. 7 is a zoom-in view of an area B in FIG. 4. Referring to FIG. 7, in some embodiments, the touch-sensing display substrate further includes a plurality of connecting lines CL. A respective one of the plurality of connecting lines CL is electrically connected to a corresponding first touch-sensing electrode. For example, the respective one of the plurality of connecting lines CL is electrically connected to the corresponding first touch-sensing electrode in parallel. Because the respective one of the plurality of connecting lines CL is electrically connected to the corresponding first touch-sensing electrode, an electrical resistance of the corresponding first touch-sensing electrode is reduced, which may solve the problem of a high electrical resistance of the corresponding first touch-sensing electrode due to second apertures extending through the corresponding first touch-sensing electrode. The arrangement of the plurality of second apertures 102 and the plurality of connecting lines CL not only ensures that the total length of portions of the first signal line crossing over the plurality of first apertures is substantially same as the total length of portions of the second signal line crossing over the plurality of second apertures, but also avoid the electrical resistance of the respective one of the plurality of first touch-sensing electrodes from increasing.

In some embodiments, the touch-sensing display substrate includes a plurality of subpixel region SP and an inter-subpixel region ISR.

As used herein, a subpixel region SP refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

As used herein, an inter-subpixel region ISR refers to a region between adjacent subpixel regions, such as a region corresponding to a black matrix in a liquid crystal display, a region corresponding a pixel definition layer in an organic light emitting diode display panel, or a black matrix in the present display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

When the touch-sensing display substrate performs touch-control function, a respective one of the plurality of subpixel regions SP is a light transmitting region. The inter-subpixel region ISP is a light blocking region. When the touch-sensing display substrate performs display function, the respective one of the plurality of subpixel regions SP is a light emitting region. The inter-subpixel region ISP is not a light emitting region.

In some embodiments, the plurality of connecting lines CL extends through both one of the plurality of subpixel regions SP and the inter-subpixel region ISR. Optionally, a respective one of the plurality of connecting lines CL extends through one of the plurality of subpixel regions SP. Optionally, a respective one of the plurality of connecting lines CL extends through the inter-subpixel region ISR but without extending through the plurality of subpixel regions SP, which can avoid adverse effect of the plurality of connecting lines CL in the display quality (e.g., display non-uniformity).

Figure 9A:
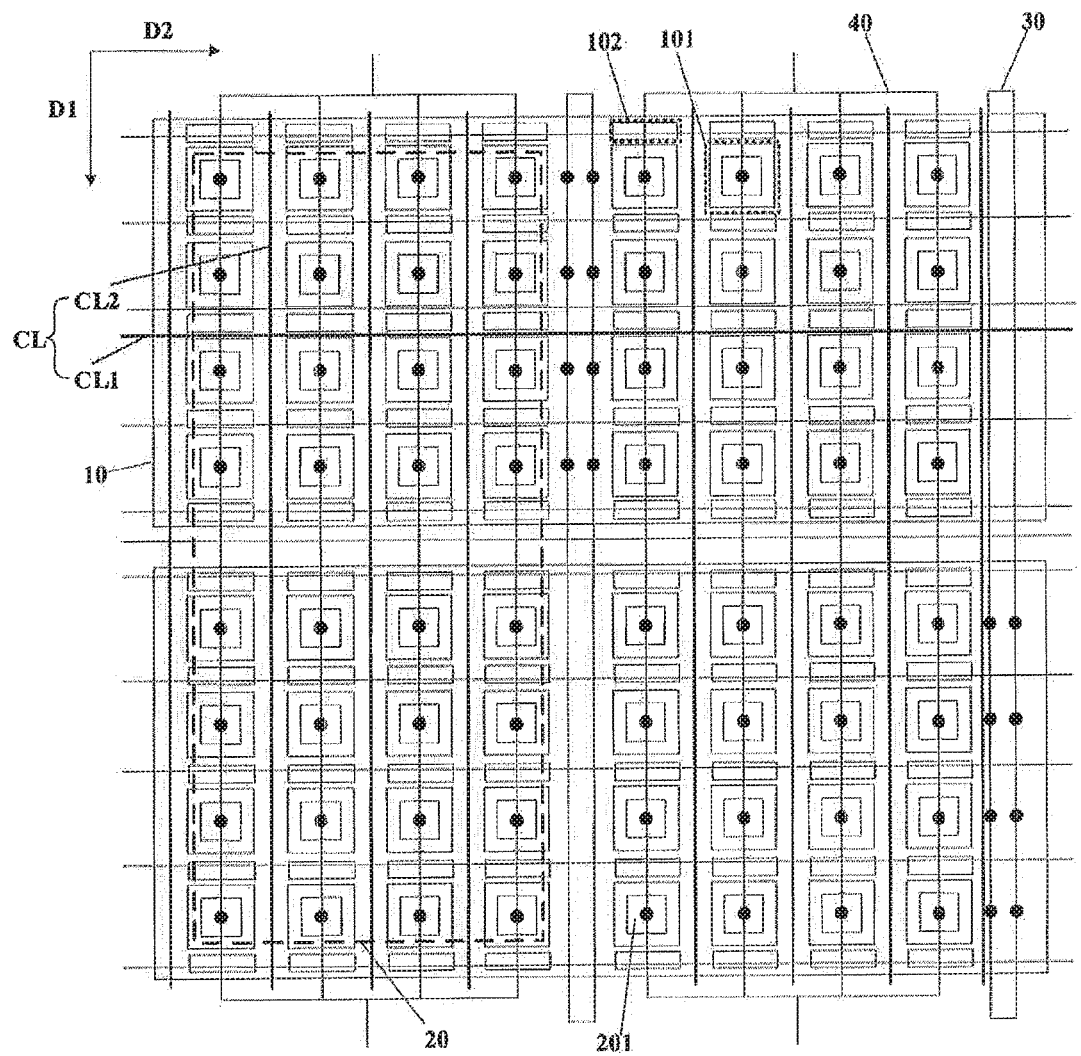
FIG. 9A is a schematic diagram of a structure of a touch-sensing display substrate in some embodiments according to the present disclosure.
Figure 9B:
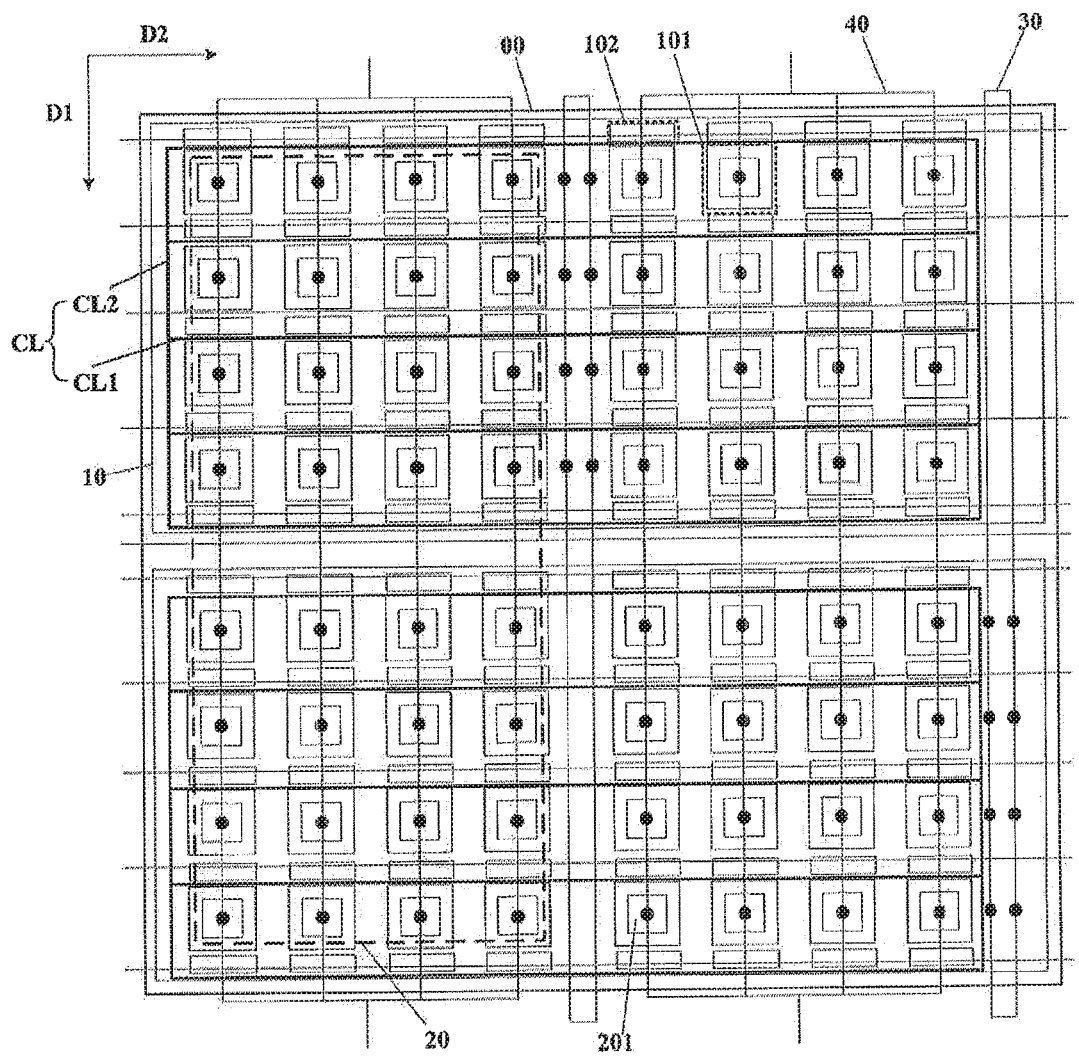
FIG. 9B is a schematic diagram of a structure of a touch-sensing display substrate in some embodiments according to the present disclosure.

FIG. 9A is a schematic diagram of a structure of a touch-sensing display substrate in some embodiments according to the present disclosure. FIG. 9B is a schematic diagram of a structure of a touch-sensing display substrate in some embodiments according to the present disclosure. In some embodiments, referring to FIG. 9A and FIG. 9B, the plurality of connecting lines CL includes a plurality of first connecting lines CL1 and a plurality of second connecting lines CL2.

In some embodiments, a plurality of first connecting lines CL1 are arranged along the first direction D1 and disposed in the inter-subpixel region ISR of the touch-sensing display substrate. Optionally, a respective one of the plurality of first connecting lines CL1 extends along the second direction D2 and is electrically connected to a corresponding first touch-sensing electrode. Optionally, multiple lines of the plurality of first connecting lines CL1 are electrically connected in parallel to each other.

Optionally, the plurality of first connecting lines CL1 are parallel to a plurality of gate lines. Optionally, the plurality of first connecting lines CL1 and the plurality of gate lines are in a same layer and includes a same material, which simplify the process of fabricating the touch-sensing display apparatus.

In some embodiments, the plurality of second connecting lines CL2 are arranged along the second direction D2 and disposed in the inter-subpixel region ISR of the touch-sensing display substrate. Optionally, the respective one of the plurality of first touch-sensing electrodes 10 is electrically connected to the plurality of second connecting lines CL2. Optionally, multiple lines of the plurality of second connecting lines CL2 are electrically connected in parallel to each other.

Optionally, the plurality of second connecting lines CL2 are parallel to a plurality of data lines. Optionally, the plurality of second connecting lines CL2 and the plurality of data lines are in a same layer and include a same material, which simplify the process of fabricating the touch-sensing display apparatus.

In some embodiments, referring to FIG. 9B, a respective one of the plurality of second connecting lines CL2 is electrically connected to end of at least one of the plurality of first connecting lines CL1. Optionally, an orthographic projection of the respective one of the plurality of first touch-sensing electrodes 10 on a base substrate 00 at least partially overlaps with an orthographic projection of the at least one of the plurality of first connecting lines CL1 electrically connected to the respective one of the plurality of second connecting lines on the base substrate 00.

In some embodiments, the respective one of the plurality of first connecting lines CL1 is electrically connected to the corresponding first touch-sensing electrode. And the corresponding first touch-sensing electrode is electrically connected to the plurality of second connecting lines CL2. Optionally, the respective one of the plurality of first connecting lines CL1 is electrically connected to the corresponding first touch-sensing electrode through at least one first connecting via. Optionally, the respective one of the plurality of second connecting lines CL2 is electrically connected to the corresponding first touch-sensing electrode through at least one second connecting via. Optionally, the at least one first connecting via and the at least one second connecting via are different vias. However, lots of vias formed on the touch-sensing display substrate may increase difficulties of fabricating the touch-sensing display substrate. And lots of vias may have an adverse effect on the display quality.

Figure 10:
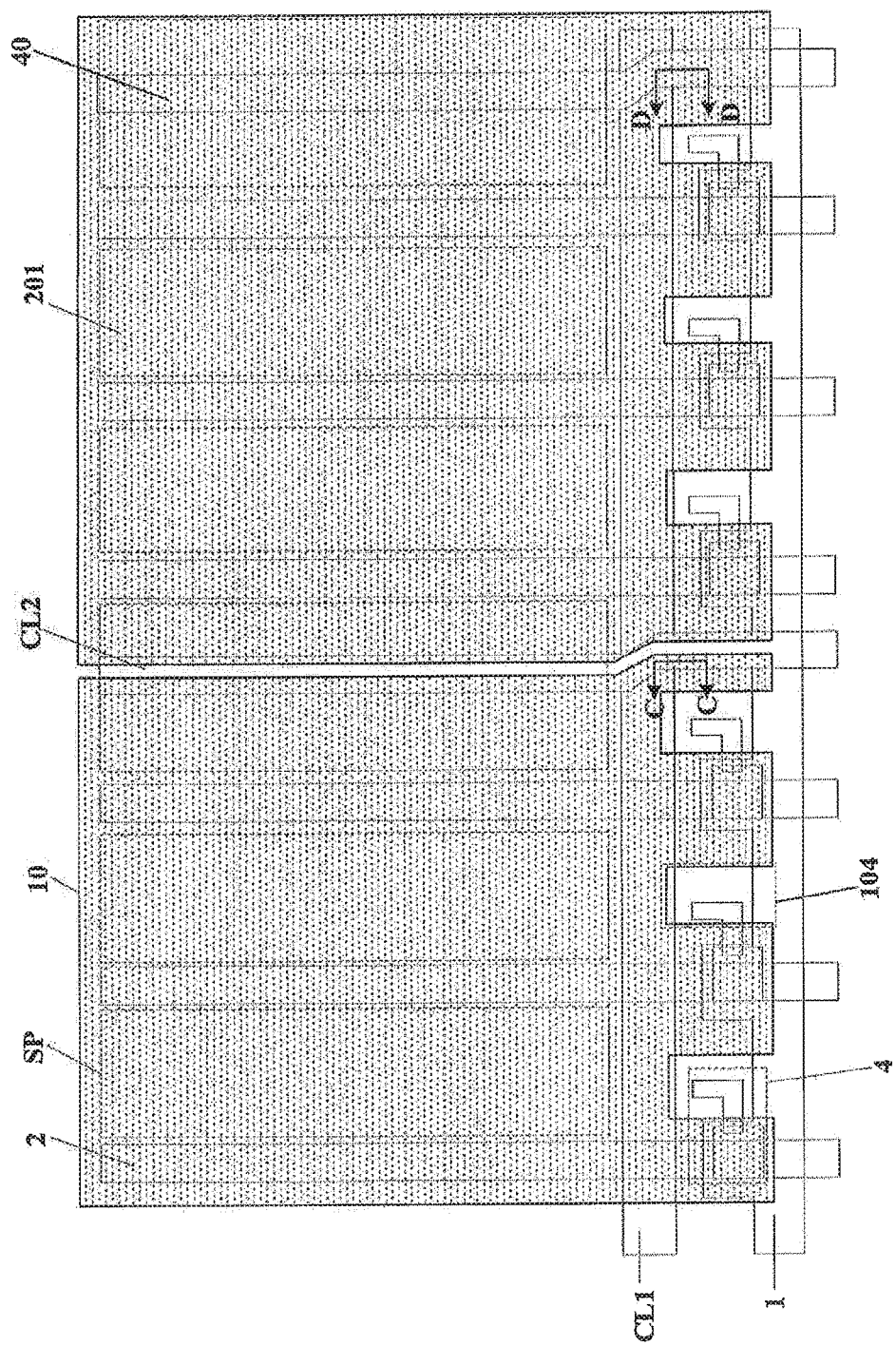
FIG. 10 is a schematic diagram of a structure of a touch-sensing display substrate in some embodiments according to the present disclosure.
Figure 11A:
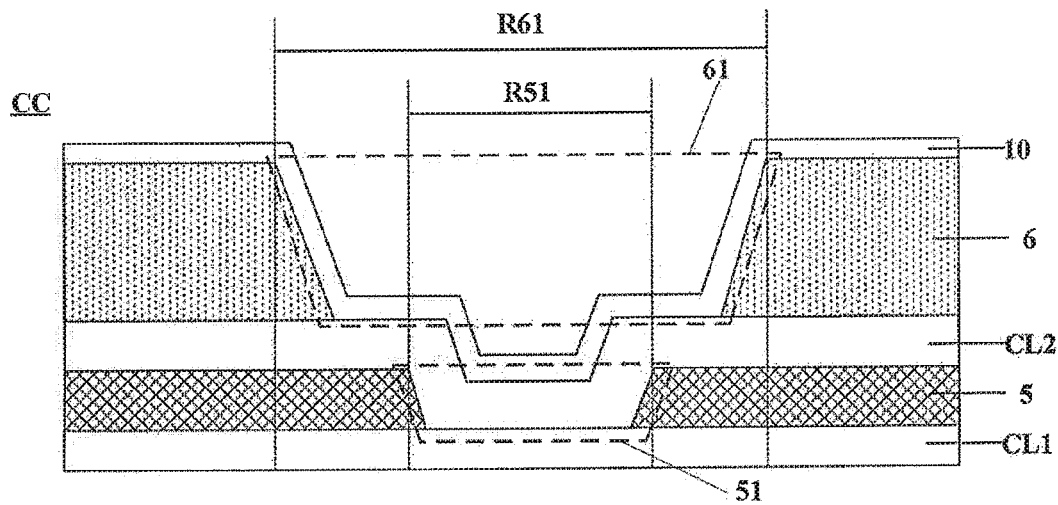
FIG. 11A is a cross-sectional view of a touch-sensing display substrate along a CC direction in FIG. 10.

FIG. 10 is a schematic diagram of a structure of a touch-sensing display substrate in some embodiments according to the present disclosure. FIG. 11A is a cross-sectional view of a touch-sensing display substrate along a CC direction in FIG. 10. Referring to FIG. 10 and FIG. 11A, in some embodiments, the touch-sensing display substrate further includes a first insulating layer 5 between the plurality of gate lines 1 and the plurality of data lines 2. Optionally, one of the plurality of first connecting lines CL1 and one of the plurality of second connecting lines CL2 are electrically connected with each other though one of the plurality of first connecting vias 51 extending through the first insulating layer 5.

In some embodiment, comparing to the plurality of gate lines 1, the plurality of data lines 2 are closer to the plurality of first touch-sensing electrodes 10. Referring to FIG. 11A, the touch-sensing display substrate further includes a second insulating layer 6 between the plurality of data lines 2 and the plurality of first touch-sensing electrodes 10. Since the plurality of second connecting lines CL2 and the plurality of data lines 2 are in the same layer, the second insulating layer 6 is between the plurality of second connecting lines CL2 and the plurality of first touch-sensing electrodes 10. Optionally, the plurality of second connecting lines CL2 respectively extend through the second insulating layer 6 to electrically connect to the plurality of first touch-sensing electrodes 10 respectively through a plurality of second connecting vias 61 extending through the second insulating layer 6.

Because the plurality of first connecting lines CL1 are respective electrically connected to the plurality sf second connecting lines CL2, and the plurality of second connecting lines CL2 are respectively electrically connected to the plurality of first touch-sensing electrodes 10, the plurality of first connecting lines CL1 are respectively electrically connected to the plurality of first touch-sensing electrodes 10. By using one of the plurality of first connecting vias 51 and one of the plurality of second connecting vias 61, one of the plurality of first connecting lines CL1, one of the plurality of second connecting lines CL2, and one of the plurality of first touch-sensing electrodes 10 are respectively connected, which simplify the process of fabricating the touch-sensing display substrate.

Figure 11B:
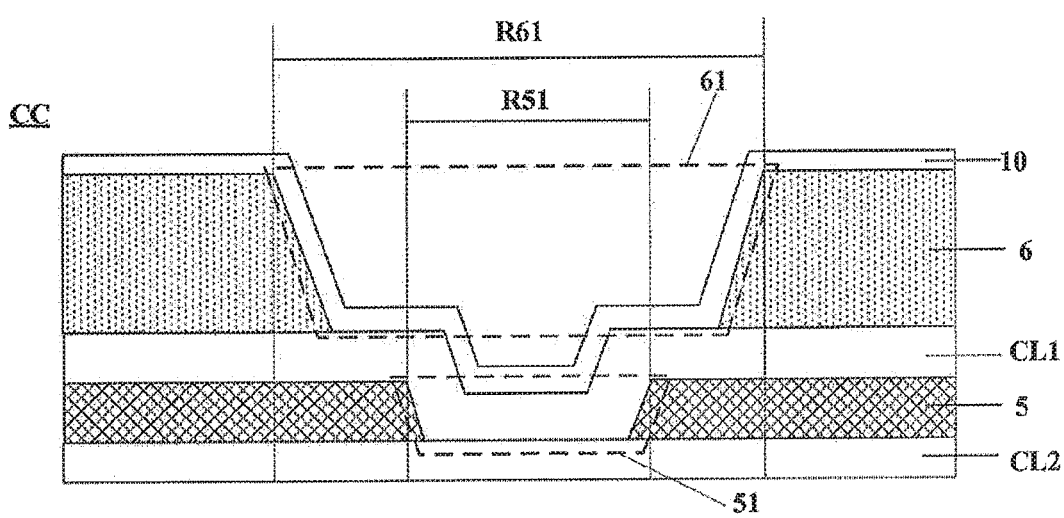
FIG. 11B is a cross-sectional view of a touch-sensing display substrate along a CC direction in FIG. 10.

In some embodiment, comparing to the plurality of data lines 2, the plurality of gate lines 1 are closer to the plurality of first touch-sensing electrodes 10. Referring to FIG. 11B, the touch-sensing display substrate further include a second insulating layer 6 between the plurality of gate lines 1 and the plurality of first touch-sensing electrodes 10. Since the plurality of first connecting lines CL1 and the plurality of gate lines 1 are in the same layer, the second insulating layer 6 is between the plurality of first connecting lines CL1 and the plurality of first touch-sensing electrodes 10. Optionally, the plurality of first connecting lines CL1 respectively extend through the second insulating layer 6 to electrically connect to the plurality of first touch-sensing electrodes 10 through a plurality of second connecting vias 61 extending through the second insulating layer 6.

Because the plurality of first connecting lines CL1 are respectively electrically connected to the plurality of second connecting lines CL2, and the plurality of first connecting liens CL1 are respectively electrically connected to the plurality of first touch-sensing electrodes 10, the plurality of second connecting lines CL2 are respectively electrically connected to the plurality of first touch-sensing electrodes 10. By using one of the plurality of first connecting vias 51 and one of the plurality of second connecting vias 61, one of the plurality of first connecting lines CL1, one of the plurality of second connecting lines CL2, and one of the plurality of first touch-sensing electrodes 10 are respectively connected, which simplify the process of fabricating the touch-sensing display substrate.

Optionally, referring to FIG. 11A and FIG. 11B, a region R51 corresponding to a respective one of the plurality of first connecting vias 51 at least partially overlaps with a region R61 corresponding to a respective one of the plurality of second connecting vias 61, which decreases an area of regions having the plurality of first connecting vias 51 and the plurality of second connecting vias 61, and decreases the adverse effect of the plurality of first connecting vias 51 and the plurality of second connecting vias 61 on the display quality.

In some embodiments, referring to FIG. 8, FIG. 10, FIG. 11A, and FIG. 11B, the touch-sensing display substrate includes a plurality of first connecting lines CL1 arranged along the first direction D1 and disposed in an inter-subpixel region ISR of the touch-sensing display substrate; and a plurality of second connecting lines CL2 arranged along the second direction D2 and disposed in the inter-subpixel region ISR of the touch-sensing display substrate. Optionally, a respective one of the plurality of first connecting lines CL1 extends along the second direction D2 and is electrically connected to the respective one of the plurality of first touch-sensing electrodes 10. Optionally, the respective one of the plurality of first touch-sensing electrodes 10 is electrically connected to the plurality of second connecting lines CL2. Optionally, the plurality of first connecting lines CLT are parallel to a plurality of gate lines 1. Optionally, the plurality of second connecting lines CL1 are parallel to a plurality of data lines 2. Optionally, the touch-sensing display substrate further includes a first insulating layer 5 between the plurality of gate lines 1 and the plurality of data lines 2. Optionally, a respective one of the plurality of second connecting lines CL2 extends through the first insulating layer 5 and electrically connects to ends of at least one of the plurality of first connecting lines CL1. Optionally, an orthographic projection of the respective one of the plurality of first touch-sensing electrodes 10 on a base substrate 00 at least partially overlaps with an orthographic projection of the at least one of the plurality of first connecting lines CL1 electrically connected to the respective one of the plurality of second connecting lines CL2 on the base substrate 00.

In some embodiments, referring to FIG. 10, the plurality of gate lines 1 and the plurality of data lines 2 defines the plurality of subpixel regions SP. When the touch-sensing display substrate is used in a liquid crystal display apparatus, a respective one of the plurality of subpixel regions SP includes a pixel electrode. When the touch-sensing display substrate is used in an electroluminescent display apparatus e.g., OLED), the respective one of the plurality of subpixel regions SP includes an anode.

In some embodiments, the touch-sensing display substrate includes a plurality of thin film transistors 4. Optionally, a respective one of the plurality of thin film transistors 4 includes a source electrode, a drain electrode, an active layer, a gate electrode, and a gate insulating layer. Optionally, the drain electrode of the respective one of the plurality of thin film transistors 4 is electrically connected to the pixel electrode or the anode. Optionally, the source electrode of the respective one of the plurality of thin film transistors 4 is electrically connected to the respective one of the plurality of data lines 2.

Optionally, the first insulating layer 5 and the gate insulating layer of the plurality of thin film transistors 4 are in a same layer and include a same material. So, the first insulating layer 5 and the gate insulating layer of the plurality of thin film transistors 4 can be formed in a same process, which simplifies the process of fabricating the touch-sensing display substrate.

Optionally, the second insulating layer 6 and a planarization layer of the plurality of thin film transistors 4 are in a same layer and include a same material. Optionally, the planarization layer includes resin. So, the second insulating layer 6 and a planarization layer of the plurality of thin film transistors 4 can be formed in a same process, which simplifies the process of fabricating the touch-sensing display substrate.

In some embodiments, when the plurality of first touch-sensing electrodes 10 and the plurality of second touch-sensing electrodes 20 are used as a common electrode, an insulating layer is formed between the common electrode and the pixel electrode or between the common electrode and the anode.

Figure 12:
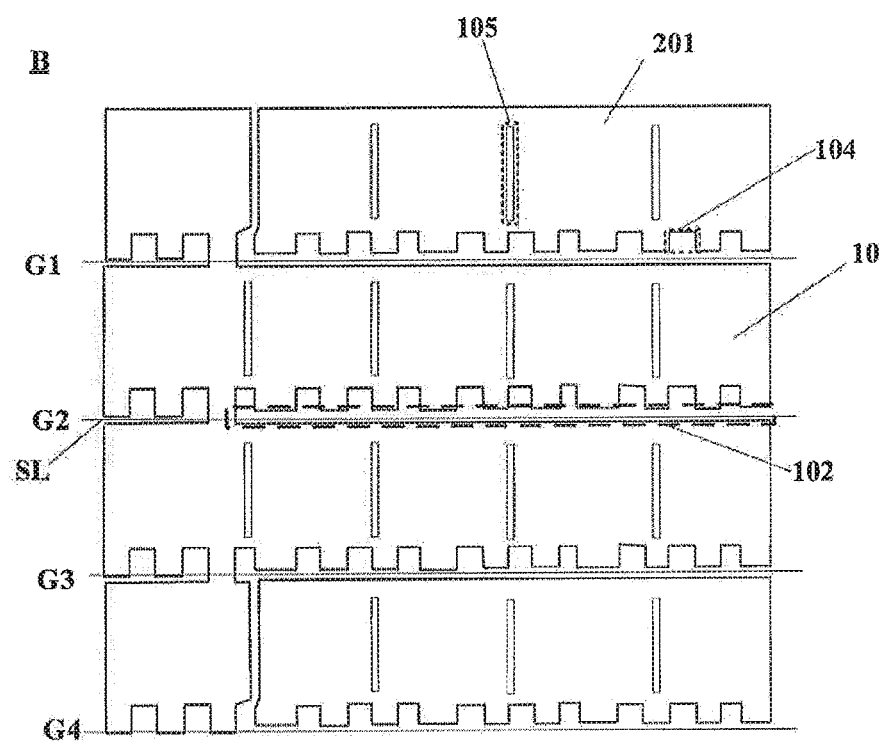
FIG. 12 is a zoom-in view of an area B in FIG. 4.

FIG. 12 is a zoom-in view of an area B in FIG. 4. Referring to FIG. 10 and FIG. 12, in some embodiments, the common electrode (e.g., the plurality of first touch-sensing electrodes 10 and the plurality of second touch-sensing electrodes 20) are formed between the plurality of thin film transistors and the pixel electrode (or the anode). In some embodiments, the touch-sensing display substrate further includes a plurality of third apertures 104. Optionally, a first portion of the plurality of third apertures 104 extend through a respective one of the plurality of first touch-sensing electrodes 10. Optionally, a second portion of the plurality of third apertures 104 extend through a respective one of the plurality of second touch-sensing sub-electrodes 201. For example, the pixel electrode or the anode is electrically connected to the drain electrode of the respective one of the plurality of thin film transistors 4 through a respective one of the plurality of the third apertures 104.

Optionally, the first portion of the plurality of third apertures 104 are included in the plurality of second apertures extending through the respective one of the plurality of first touch-sensing electrodes 10. Optionally, the respective one of the plurality of second apertures 102 is connected with at least one of the first portion of the plurality of third aperture 104.

Referring to FIG. 12, in order to further reduce loads of the plurality of first touch-sensing electrodes 10 and loads of the plurality of second touch-sensing electrodes 20, the touch-sensing display substrate further includes a plurality of fourth apertures 105 extending through the plurality of first touch-sensing electrodes 10 and loads of the plurality of second touch-sensing electrodes 20.

Figure 13:
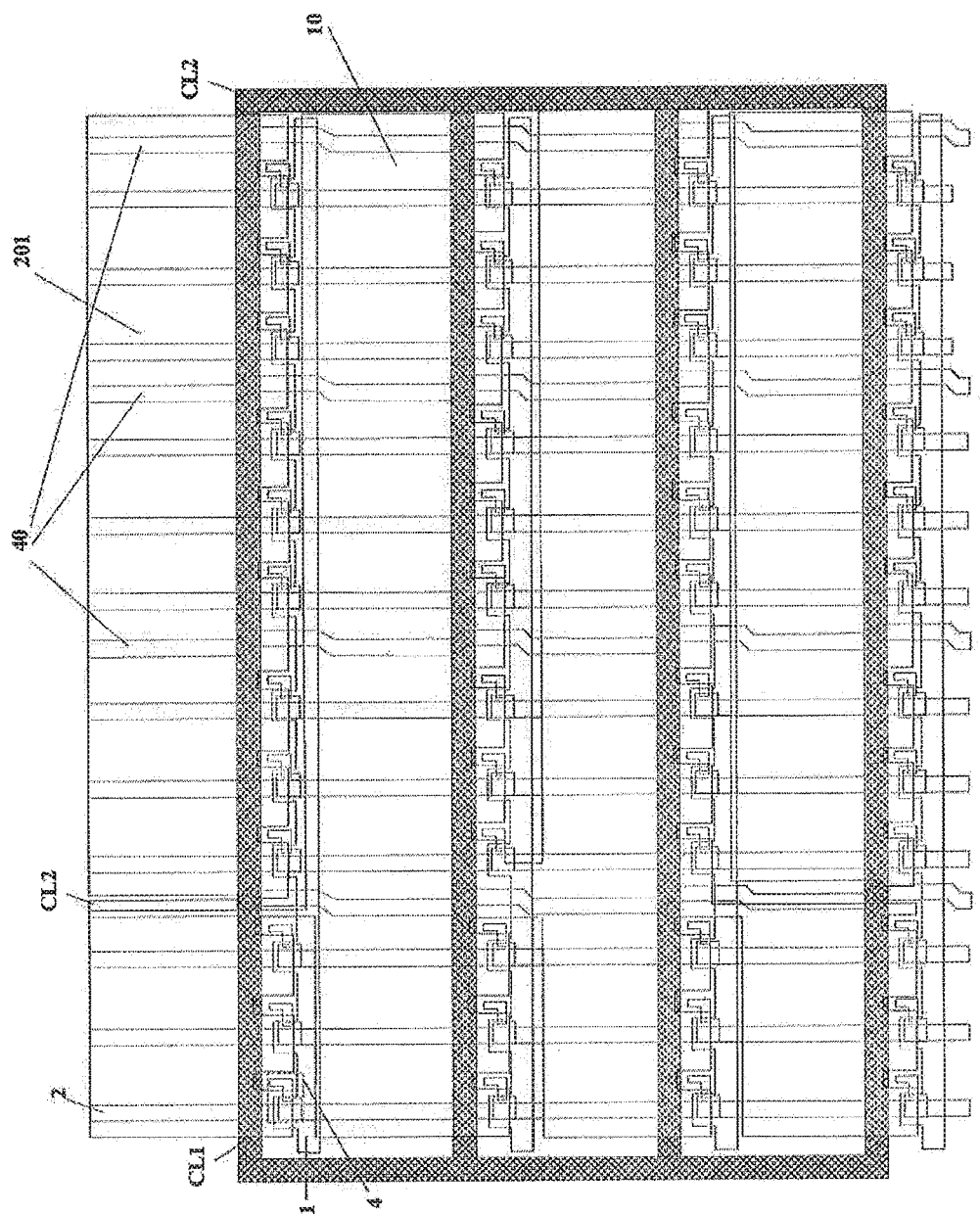
FIG. 13 is a schematic diagram of a structure of a touch-sensing display substrate in some embodiments according to the present disclosure.

FIG. 13 is a schematic diagram of a structure of a touch-sensing display substrate in some embodiments according to the present disclosure. In some embodiments, referring to FIG. 13, optionally, the plurality of first connecting lines CL and the plurality of second connecting lines CL2 are electrically connected. Optionally, the plurality of first connecting lines CLT are electrically connected. Optionally, the plurality of the second connecting lines CL2 are electrically connected.

For example, the plurality of first connecting lines CL1 are electrically connected, so, the plurality of first connecting lines CL1 are short. The plurality of second connecting lines CL2 are electrically connected, so, the plurality of second connecting lines CL2 are short. Because the respective one of the plurality of first touch-sensing electrodes 10 are electrically connected to at least one of the plurality of first connecting lines CL1 and to at least one of the plurality of second connecting lines CL2, the electrical resistance of the respective one of the plurality of first touch-sensing electrodes 10 is further reduces.

In some embodiments, referring to FIG. 3A and FIG. 3B, the touch-sensing display substrate further includes a plurality of first touch-sensing signal lines 30 arranged along the second direction D2; and a plurality of second touch-sensing signal lines 40 arranged along the second direction D2. Optionally, a respective one of the plurality of first touch-sensing signal lines 30 and a respective one of the plurality of second touch-sensing signal lines 40 extend along the first direction D1. Optionally, the respective one of the plurality of first touch-sensing signal lines 30 is electrically connected to the respective one of the plurality of first touch-sensing electrodes 10. Optionally, the respective one of the plurality of second touch-sensing signal lines 40 is electrically connected to the respective one of the plurality of second touch-sensing electrodes 20.

Optionally, in order to conveniently connect the respective one of the plurality of second touch-sensing signal lines 40 to the plurality of second touch-sensing sub-electrodes 201 of the respective one of the plurality of second touch-sensing electrodes 20, the plurality of second touch-sensing sub-electrodes 201 are arranged in array. For example, the plurality of second touch-sensing sub-electrodes 201 in the respective one of the plurality of second touch-sensing electrodes 20 are arranged in an 8×4 array.

Optionally, the plurality of data lines 2 extend along the first direction D1. Optionally, the plurality of first touch-sensing signal lines 30, the plurality of second touch-sensing signal lines 40, and the plurality of data lines 2 are in a same layer and include a same material. Optionally, the plurality of first touch-sensing signal lines 30, the plurality of second touch-sensing signal lines 40, and the plurality of data lines 2 are parallel to each other. So, the plurality of first touch-sensing signal lines 30, the plurality of second touch-sensing signal lines 40, and the plurality of data lines 2 can be formed in a same process.

Optionally, the plurality of first touch-sensing electrodes 10 and the plurality of second touch-sensing electrodes 20 are in a same layer and include a same material. Optionally, the plurality of first touch-sensing electrodes 10 and the plurality of second touch-sensing electrodes 20 are in different layers.

Figure 14:
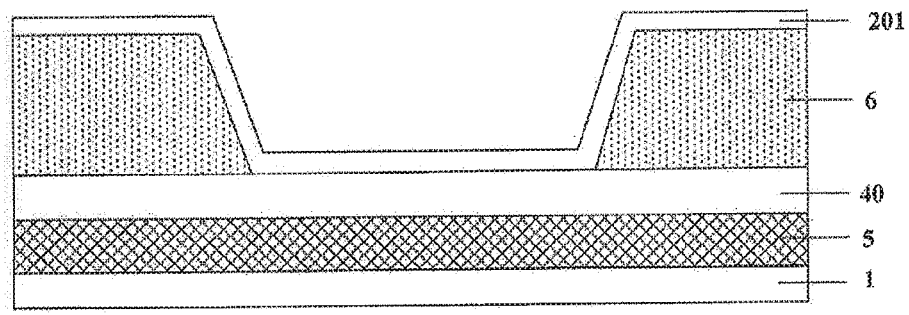
FIG. 14 is a cross-sectional view of a touch-sensing display substrate along a DD direction in FIG. 10.

For example, comparing to the plurality of gate lines 1, the plurality of data lines 2 is closer to the plurality of second touch-sensing electrodes 20, the plurality of first touch-sensing electrodes 10 and the plurality of second touch-sensing electrodes 20 are in a same layer and include a same material. Referring to FIG. 10 and FIG. 14, vias are formed extending through the second insulating layer 6 between the plurality of second touch-sensing electrodes 20 and the plurality of second touch-sensing signal lines 40, no via is formed in the first insulating layer 5 between the plurality of data lines 2 and the plurality of gate lines 1, so the respective one of the plurality of second touch-sensing electrodes 20 are electrically connected to the respective one of the plurality of second touch-sensing signal lines 40, the respective one of the plurality of second touch-sensing electrodes 20 is insulated from the plurality of gate lines 1 and the plurality of connecting lines parallel to the plurality of gate lines.

For example, referring to FIG. 10, the plurality of first connecting lines CL1 is parallel to the plurality of gate lines 1, the plurality of second touch-sensing electrodes 20 are insulated from the plurality of first connecting lines CL1.

In some embodiments, the plurality of first touch-sensing signal lines 30 and the plurality of second touch-sensing signal lines 40 extend along the first direction D1, an integrated circuit can be disposed on a side of the touch-sensing display substrate to perform driving from a single side, which can narrow the frame of the display apparatus.

Referring to FIG. 15, FIG. 16A, FIG. 16B, FIG. 16C, in some embodiments, the touch-sensing structure includes a plurality of first touch-sensing electrodes 10 arranged along a first direction D1 and extending along a second direction D2. In order to detect a touch position, the touch-sensing structure further includes a plurality of second touch-sensing electrodes 20 arranged along the second direction D2 and extending along the first direction D1; and a plurality of second touch-sensing signal lines 40 extending along the first direction D1. Optionally, a respective one of the plurality of second touch-sensing signal lines 40 is electrically connected to a corresponding second touch-sensing electrode (e.g., one of the plurality of second touch-sensing electrodes 20). Optionally, the first direction D1 is different from the second direction D2. Optionally, the respective one of the plurality of second touch-sensing signal lines 40 is substantially parallel to the plurality of second touch-sensing electrodes 20. Optionally, an orthographic projection of the respective one of the plurality of second touch-sensing signal lines 40 on a base substrate 00 at least partially overlaps with an orthographic projection of the one of the plurality of second touch-sensing electrodes 20 on the base substrate 00.

Optionally, the respective one of the plurality of first touch-sensing electrodes 10 is insulated from the plurality of second touch-sensing electrodes 20. Optionally, the respective one of the plurality of second touch-sensing electrodes 20 is insulated from the plurality of first touch-sensing electrodes 10.

Optionally, the respective one of the plurality of first touch-sensing electrodes 10 is a transmitting (TX) electrode (e.g., a scanning electrode), and the respective one of the plurality of second touch-sensing electrodes 20 is a receiving (RX) electrode (e.g., a sensing electrode). The respective one of the plurality of first touch-sensing signal lines 30 electrically connected to the corresponding first touch-sensing electrode is a transmitting line (TX line). The respective one of the plurality of second touch-sensing signal lines 40 electrically connected to the corresponding second touch-sensing electrode is a receiving line (RX line).

Optionally, the respective one of the plurality of second touch-sensing electrodes 20 is a transmitting (TX) electrode, and the respective one of the plurality of first touch-sensing electrodes 10 is a receiving (RX) electrode.

Figure 15:
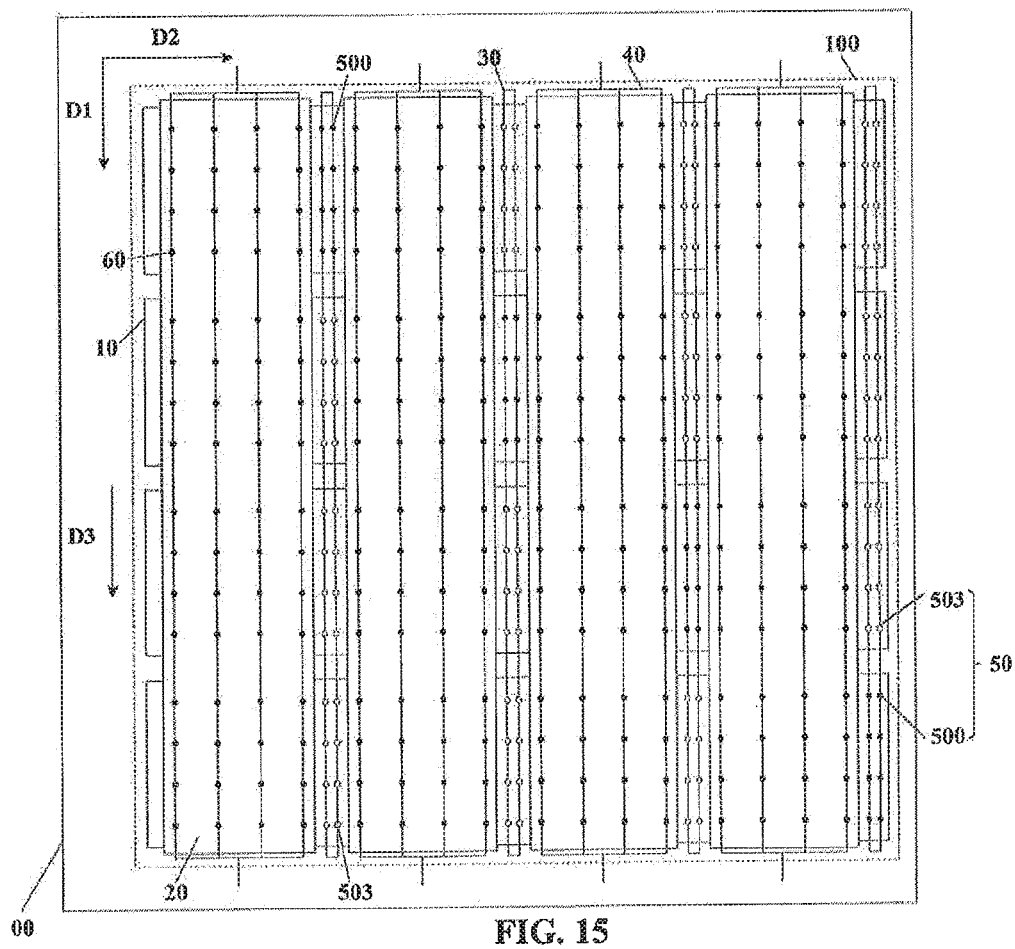
FIG. 15 is a schematic diagram of a structure of a touch-sensing display substrate in some embodiments according to the present disclosure.

Optionally, referring to FIG. 15, the plurality of first touch-sensing electrodes 10 and the plurality of second touch-sensing electrodes 20 are in different layers. For example, the plurality of first touch-sensing electrodes 10 are insulated from the plurality of second touch-sensing electrodes 20 using an insulating layer.

Figure 16A:
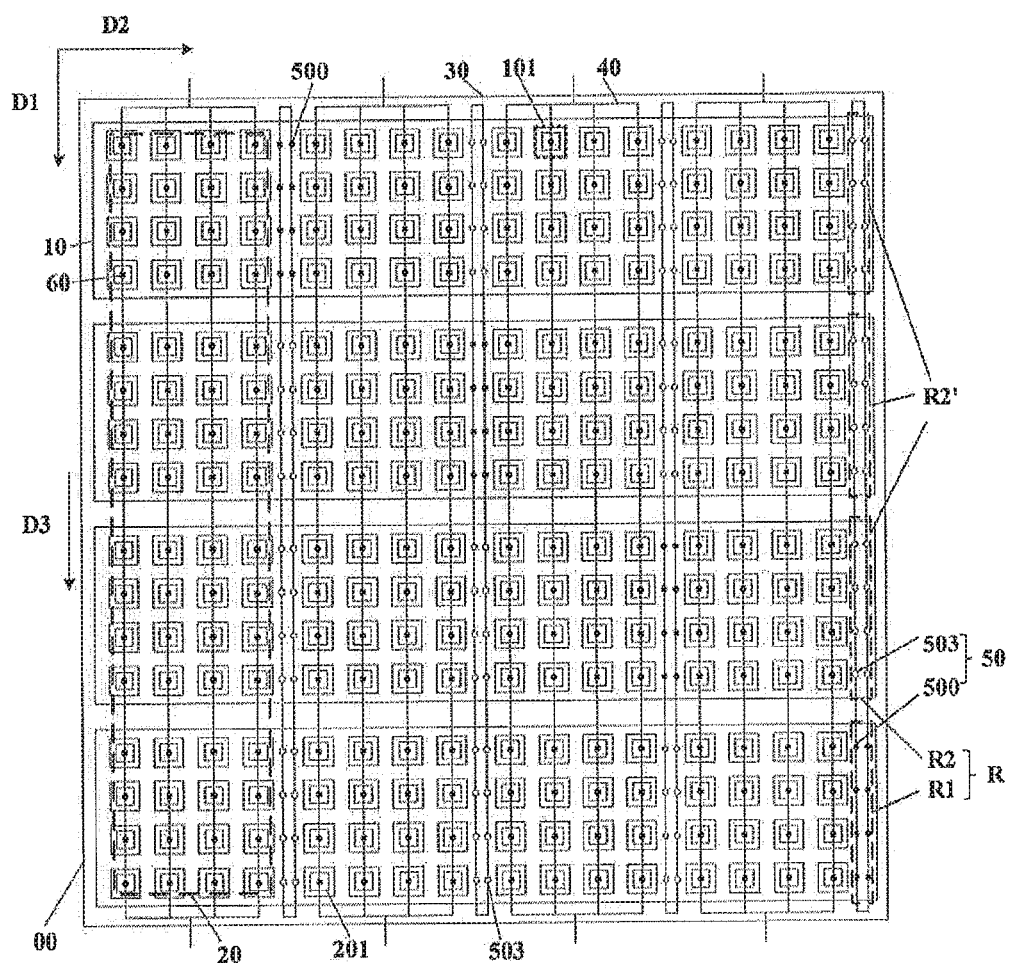
FIG. 16A is a schematic diagram of a structure of a touch-sensing display substrate in some embodiments according to the present disclosure.
Figure 16B:
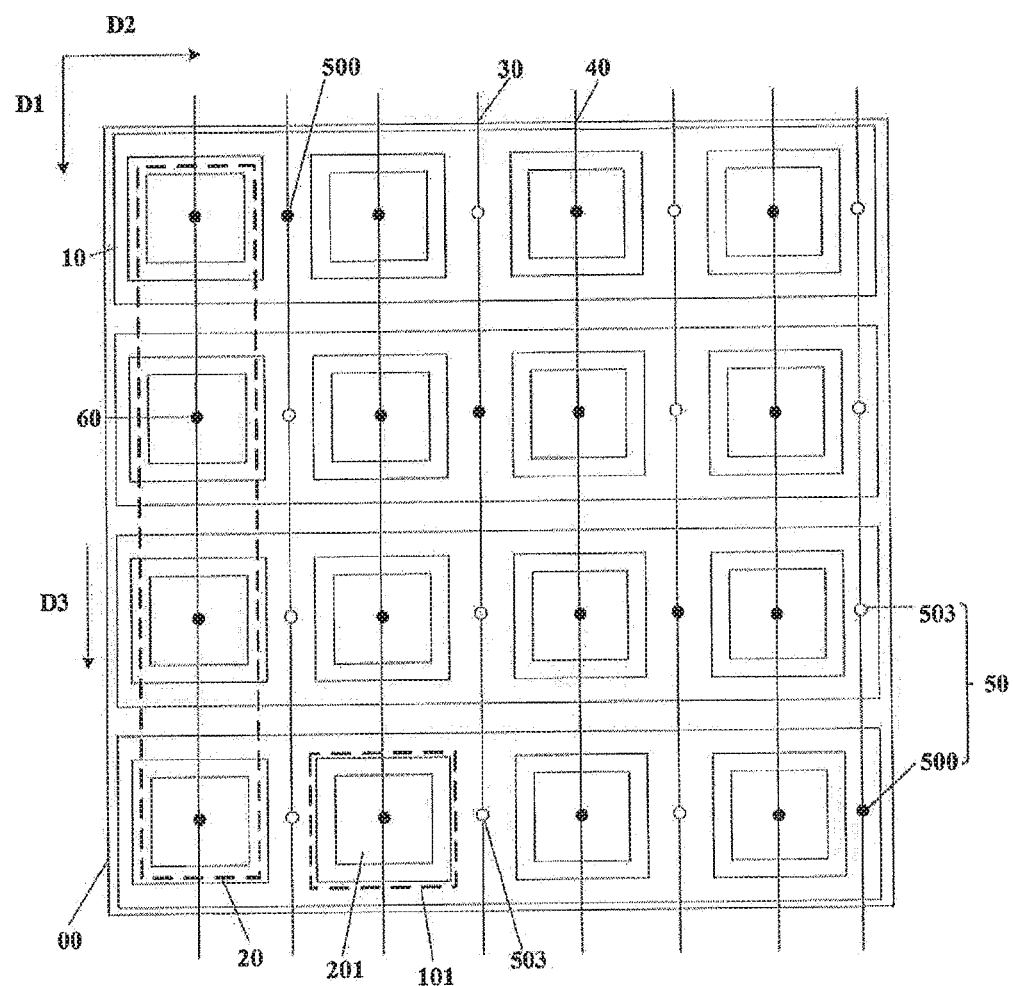
FIG. 16B is a schematic diagram of a structure of a touch-sensing display substrate in some embodiments according to the present disclosure.
Figure 16C:
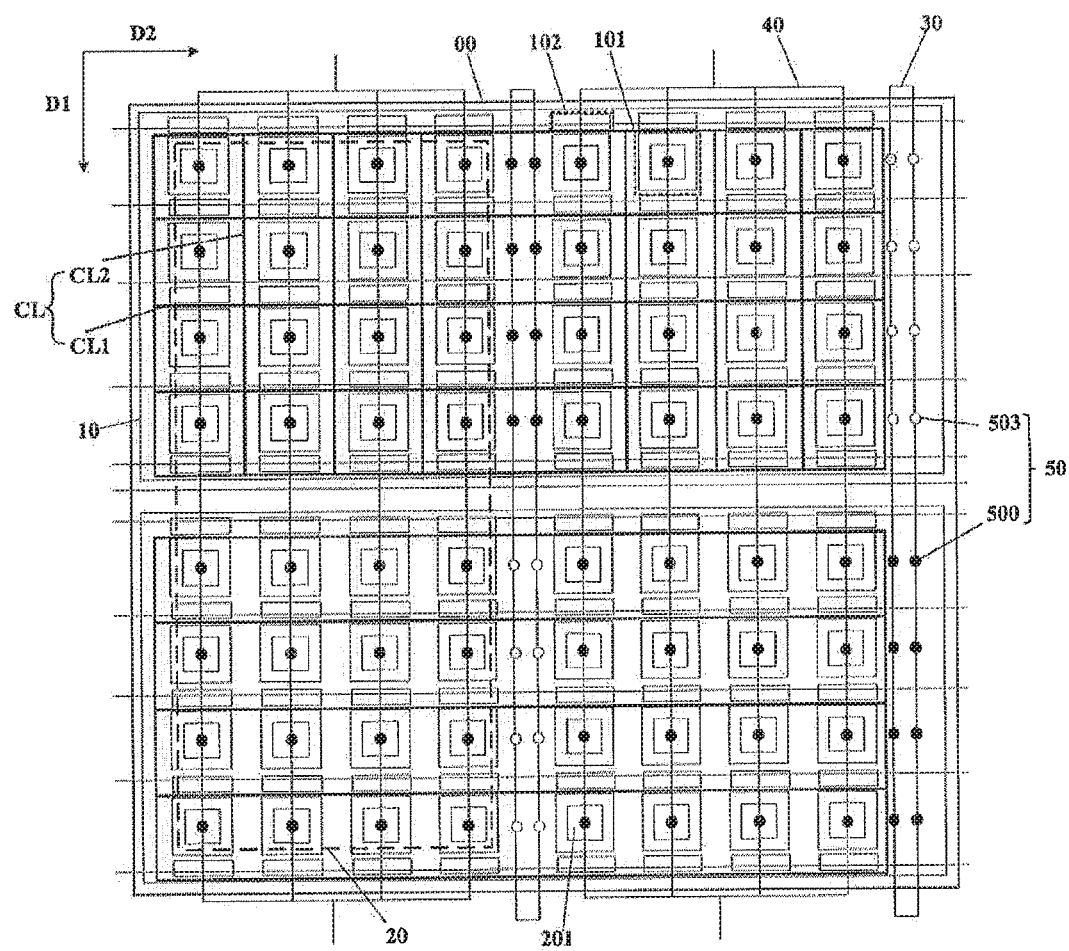
FIG. 16C is a schematic diagram of a structure of a touch-sensing display substrate in some embodiments according to the present disclosure.

Optionally, referring to FIG. 16A, FIG. 16B, and FIG. 16C, the plurality of first touch-sensing electrodes 10 and the plurality of second touch-sensing electrodes 20 are in a same layer, the plurality of first touch-sensing electrodes 10 and the plurality of second touch-sensing electrodes 20 can be formed within a same process, which can simplify the process of fabricating the touch-sensing substrate.

As used herein, the term "same layer" refers to the relationship between the layers simultaneously formed in the same step. In one example, the plurality of first touch-sensing electrodes 10 and the plurality of second touch-sensing electrodes 20 are in a same layer when they are formed as a result of one or more steps of a same patterning process performed in a same layer of material. In another example, the plurality of first touch-sensing electrodes 10 and the plurality of second touch-sensing electrodes 20 can be formed in a same layer by simultaneously performing the step of forming the plurality of first touch-sensing electrodes 10 and the step of forming the plurality of second touch-sensing electrodes 20. The term "same layer" does not always mean that the thickness of the layer or the height of the layer in a cross-sectional view is the same.

Various appropriate arrangements of touch-sensing electrodes can be used. For example, the respective one of the plurality of first touch-sensing electrodes is an integral portion including a plurality of first touch-sensing sub-electrodes connected together, and the respective one of the plurality of second touch-sensing electrodes includes a plurality of second touch-sensing sub-electrodes 201 spaced apart from each other. A column of second touch-sensing sub-electrodes of the plurality of second touch-sensing sub-electrodes in the respective one of the plurality of second touch-sensing electrodes are connected by bridges (e.g., signal lines, signal wires). The bridges are insulated from the plurality of first touch-sensing electrodes.

Referring to FIG. 16A, in one example, the touch-sensing display substrate further includes a plurality of first apertures 101 respectively extending through a thickness of the respective one of the plurality of first touch-sensing electrodes 10. The plurality of first apertures 101 are arranged in multiple rows. The respective one of the plurality of second touch-sensing electrodes 20 includes a plurality of second touch-sensing sub-electrodes 201. The plurality of second touch-sensing sub-electrodes 201 are arranged in multiple columns. In a region where multiple row regions corresponding to the plurality of first apertures 101 overlaps with the multiple column regions corresponding to the plurality of second touch-sensing sub-electrodes 201, a respective second touch-sensing sub-electrodes 201 is in a region corresponding to a respective first apertures 101.

Referring to FIG. 16B, in another example, the plurality of first apertures 101 are arranged in one row. The plurality of second touch-sensing sub-electrodes 201 are arranged in one column. In a region where a row region corresponding to the plurality of first apertures 101 overlaps with a column region corresponding to the plurality of second touch-sensing sub-electrodes 201, a respective second touch-sensing sub-electrodes 201 is in a region corresponding to a respective first apertures 101.

Optionally, by using the electrode arrangements in FIG. 16A, FIG. 16B, and FIG. 16C, the plurality of first touch-sensing electrodes 10 and the plurality of second touch-sensing electrodes 20 can be formed in a same layer. Optionally, the plurality of first touch-sensing electrodes 10 and the plurality of second touch-sensing electrodes 20 can be formed in the same process. Optionally, an insulating layer is absent between the plurality of first touch-sensing electrodes 10 and the plurality of second touch-sensing electrodes 20. So, the process of fabricating the touch-sensing display substrate is simplified, and the efficiency of fabricating the touch-sensing display substrate is improved.

When the plurality of first touch-sensing electrodes 10 and the plurality of second touch-sensing electrodes 20 are formed in a same layer, the plurality of first touch-sensing electrodes 10 and the plurality of second touch-sensing electrodes 20 can be used as a common electrode when the display substrate displays an image. So, the plurality of first touch-sensing electrodes 10 and the plurality of second touch-sensing electrodes 20 are not only used to perform a touch-control function, but also used to perform a display function. Furthermore, the touch control function and the display function can be performed at the same time, which can obviate the issue of insufficient charging time of data lines, if the touch control function and the display function are performed in a time division fashion, the data line may not be sufficiently charged during the limited charging period. The problem becomes particularly severe in high resolution display panels. Moreover, the present apparatus is compatible with an active pen.

Optionally, the touch-sensing structure 100 further includes a plurality of first touch-sensing signal lines 30 and a plurality of second touch-sensing signal lines 40. Optionally, the plurality of first touch-sensing signal lines 30 and the plurality of second touch-sensing signal lines 40 extend along a same direction. For example, the plurality of first touch-sensing signal lines 30 and the plurality of second touch-sensing signal lines 40 extend along the first direction D1.

Optionally, the plurality of second touch-sensing electrodes 20 extends along a same direction (e.g., the first direction D along which the plurality of second touch-sensing signal lines 40 extend. Optionally, the respective one of the plurality of second touch-sensing signal lines 40 connects a column of second touch-sensing sub-electrodes of the plurality of second touch-sensing sub-electrodes 201 in the respective one of the plurality of second touch-sensing electrodes 20.

Optionally, a plurality of touch-sensing vias 60 extending through an insulating layer, between the plurality of second touch-sensing electrodes 20 and the plurality of second touch-sensing signal lines 40, are evenly distributed on the insulating layer to allow the respective one of the plurality of second touch-sensing signal lines 40 to be electrically connected to the corresponding second touch-sensing electrode. For example, a plurality of touch-sensing vias 60 are evenly distributed in regions where the plurality of second touch-sensing signal lines 40 crosses through the plurality of second touch-sensing electrodes 20. The evenly distributed touch-sensing vias 60 will avoid the display uniformity problem and improve the display quality of the touch-sensing display substrate.

Figure 17:
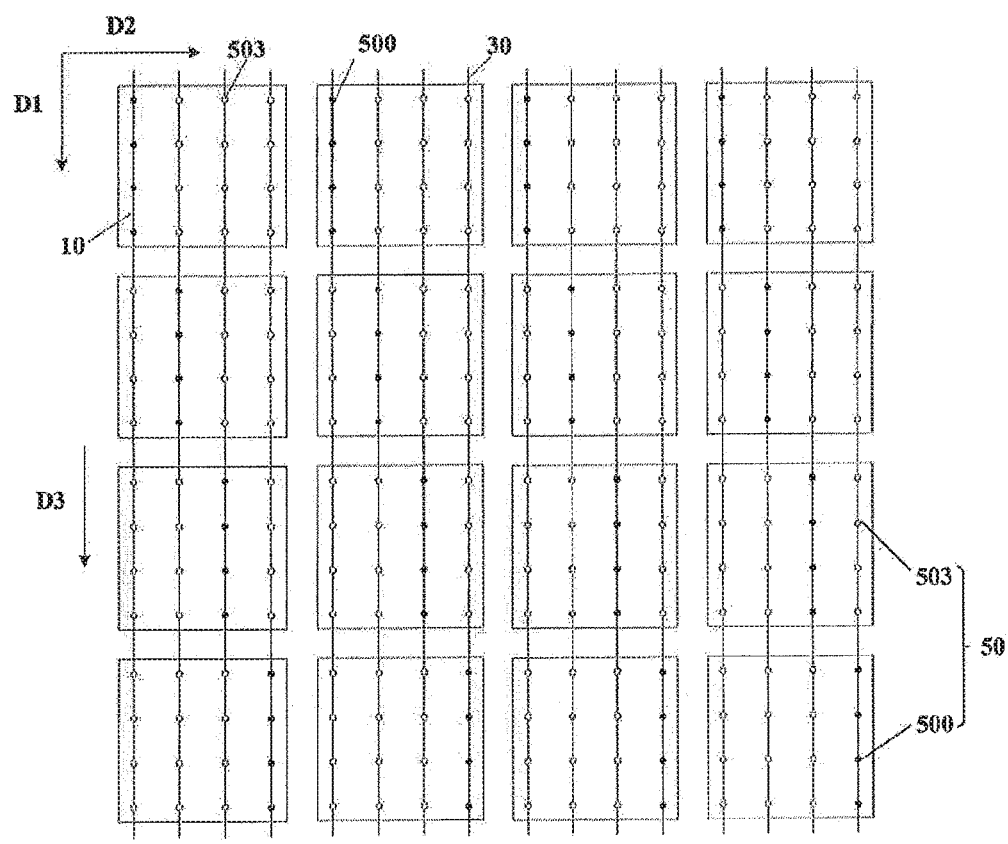
FIG. 17 is a schematic diagram of a structure of a touch-sensing display substrate in some embodiments according to the present disclosure.

In some embodiments, referring to FIG. 17, the plurality of first touch-sensing electrodes 10 are arranged in array. Optionally, an array of the plurality of first touch-sensing electrodes 10 has m rows and n columns, wherein m and n are positive integers, m≥2, n≥2. For example, the array of the plurality of first touch-sensing electrodes 10 has 80 rows and 100 columns. Optionally, the plurality of first touch-sensing electrodes 10 can be used as a common electrode.

When the plurality of first touch-sensing electrodes 10 are used as the common electrode, the touch control function and the display function can be performed by the touch-sensing display substrate. Instead of forming a common electrode, using the plurality of first touch-sensing electrodes 10 as the common electrode can reduce a thickness of the touch-sensing display substrate.

Optionally, the plurality of first touch-sensing electrodes and the plurality of second touch-sensing electrodes are substantially transparent. As used herein, the term "substantially transparent" means at least 50 percent (e.g., at least 60 percent, at least 70 percent, at least 80 percent, at least 90 percent, and at least 95 percent) of an incident light in the visible wavelength range transmitted therethrough.

Various appropriate electrode materials and various appropriate fabricating methods may be used to make the plurality of first touch-sensing electrodes and the plurality of second touch-sensing electrodes. Examples of appropriate electrode materials for making the plurality of first touch-sensing electrodes and the plurality of second touch-sensing electrodes include, but are not limited to, Indium Tin Oxide (ITO), and Indium Zinc Oxide (IZO).

In another aspect, the present disclosure also provides a touch-sensing display apparatus. In some embodiments, the touch-sensing display apparatus includes a touch-sensing display substrate described herein. Optionally, the touch-sensing display apparatus is operated in a time division mode including a display mode and a touch control mode.

Optionally, in the display mode, the plurality of first touch-sensing electrodes are used as a common electrode and are configured to be provided with a common voltage. Optionally, the plurality of first touch-sensing electrodes and the plurality of second touch-sensing electrodes are used as the common electrode.

Optionally, in the touch control mode, the plurality of first touch-sensing electrodes are a plurality of touch sensing electrodes configured to transmit touch signals. Optionally, the plurality of second touch-sensing electrodes are a plurality of touch scanning electrodes configured to provide a scanning signal.

Optionally, the touch-sensing display apparatus includes one or more integrated circuits connected to the touch-sensing display substrate. Examples of appropriate touch-sensing display apparatuses include, but are not limited to, an electronic paper, a mobile phone, a tablet computer, a television, a monitor, a notebook computer, a digital album, a GPS, wireless devices, personal data assistants (PDAs), handheld or portable computers, GPS receivers/navigators, cameras, MP4 video players, camcorders, game consoles, watches, clocks, calculators, TV monitors flat panel display, computer monitor, car display (e.g., odometer display, etc.), navigator, cockpit controller and/or display, camera view display (e.g., rear view camera display in a vehicle), electronic photo, electronic Billboards or signs, projectors, architectural structures, packaging, and aesthetic structures (e.g., displays for images of a piece of jewelry), etc.

In another aspect, the present disclosure also provides a method of operating a touch sensing display apparatus. In some embodiments, the method of operating a touch sensing display apparatus includes operating a touch sensing display apparatus described herein in a time division mode including a display mode and a touch control mode.

Optionally, in the display mode, the plurality of first touch-sensing electrodes are used as a common electrode and are configured to be provided with a common voltage. Optionally, the plurality of first touch-sensing electrodes and the plurality of second touch-sensing electrodes are used as the common electrode.

Optionally, in the touch control mode, the plurality of first touch-sensing electrodes are a plurality of touch sensing electrodes configured to transmit touch signals. Optionally, the plurality of second touch-sensing electrodes are a plurality of touch scanning electrodes configured to provide a scanning signal.

In another aspect, the present disclosure also provides a method of fabricating a touch-sensing display substrate. In some embodiments, the method of fabricating a touch-sensing display substrate includes forming a plurality of first touch-sensing electrodes arranged along a first direction, a respective one of the plurality of first touch-sensing electrodes extending along a second direction different from the first direction; forming a plurality of first apertures respectively extending through a thickness of a respective one of the plurality of first touch-sensing electrodes, the plurality of first apertures arranged along the second direction; a plurality of second apertures respectively extending through of a thickness of the respective one of the plurality of first touch-sensing electrodes the plurality of second apertures arranged along the second direction; and forming a plurality of signal lines. Optionally, a first signal line of the plurality of signal lines is formed to extend along the second direction and crosses over the plurality of first apertures in one of the plurality of first touch-sensing electrodes but not the plurality of second apertures in any first touch-sensing electrode. Optionally, a second signal line of the plurality of signal lines is formed to extend along the second direction and crosses over the plurality of second apertures in a same as or different from the one of the plurality of first touch-sensing electrodes crossed-over by the first signal line, but not the plurality of first apertures in any first touch-sensing electrode.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention, it should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch-sensing display substrate, comprising:
   a plurality of first touch-sensing electrodes arranged along a first direction, a respective one of the plurality of first touch-sensing electrodes extending along a second direction different from the first direction;
   a plurality of first apertures respectively extending through a thickness of a respective one of the plurality of first touch-sensing electrodes, the plurality of first apertures arranged along the second direction;
   a plurality of second apertures respectively extending through of a thickness of the respective one of the plurality of first touch-sensing electrodes, the plurality of second apertures arranged along the second direction; and
   a plurality of signal lines;
   wherein a first signal line of the plurality of signal lines extends along the second direction and crosses over the plurality of first apertures in one of the plurality of first touch-sensing electrodes but not the plurality of second apertures in any first touch-sensing electrode; and
   a second signal line of the plurality of signal lines extends along the second direction and crosses over the plurality of second apertures in a same as or different from the one of the plurality of first touch-sensing electrodes crossed-over by the first signal line, but not the plurality of first apertures in any first touch-sensing electrode.

2. The touch-sensing display substrate of claim 1, wherein the first signal line and the second signal line are configured to transmit signals of a same type.

3. The touch-sensing display substrate of claim 1, wherein a total length of portions of the first signal line crossing over the plurality of first apertures is substantially same as a total length of portions of the second signal line crossing over the plurality of second apertures.

4. The touch-sensing display substrate of claim 1, wherein a respective first aperture of the plurality of first apertures and a respective second aperture of the plurality of second apertures are arranged along the first direction; and
   a length of a portion of the first signal line crossing over the respective first aperture is substantially same as a length of a portion of the second signal line crossing over the respective second aperture.

5. The touch-sensing display substrate of claim 1, wherein the first signal line respectively crosses over each of the plurality of first apertures by a substantially same first length;
   the second signal line respectively crosses over each of the plurality of second apertures by a substantially same second length; and
   the substantially same first length and the substantially same second length are substantially same.

6. The touch-sensing display substrate of claim 1, wherein the plurality of signal lines are configured to transmit signals of a same type;
   each of substantially all of the plurality of signal lines crosses over multiple apertures in one of the plurality of first touch-sensing electrodes;
   wherein substantially all of the plurality of signal lines comprise a first group of signal lines and a second group of signal lines;
   a respective one of the first group of signal lines crosses over multiple first apertures of the plurality of first apertures in a corresponding one of the plurality of first touch-sensing electrodes;
   a respective one of the second group of signal lines crosses over multiple second apertures of the plurality of second apertures in a corresponding one of the plurality of first touch-sensing electrodes.

7. The touch-sensing display substrate of claim 6, further comprising a plurality of first touch-sensing signal lines arranged along the second direction; and
   a plurality of second touch-sensing signal lines arranged along the second direction;

wherein a respective one of the plurality of first touch-sensing signal lines and a respective one of the plurality of second touch-sensing signal lines extend along the first direction.

8. The touch-sensing display substrate of claim 6, wherein the plurality of first touch-sensing electrodes and the plurality of second touch-sensing electrodes are in a same layer and comprise a same material.

9. The touch-sensing display substrate of claim 1, further comprising:
a plurality of second touch-sensing electrodes arranged along the second direction and crossing over the plurality of first touch-sensing electrodes; and
a plurality of second touch-sensing signal lines arranged along the second direction;
wherein a respective one of the plurality of second touch-sensing electrodes comprises a plurality of second touch-sensing sub-electrodes;
one of the plurality of second touch-sensing sub-electrodes of the respective one of the plurality of second touch-sensing electrodes is in a region corresponding to one of the plurality of first apertures corresponding to the respective one of the plurality of first touch-sensing electrodes; and
the respective one of the plurality of second touch-sensing signal lines connects a column of second touch-sensing sub-electrodes of the plurality of second touch-sensing sub-electrodes in the respective one of the plurality of second touch-sensing electrodes.

10. The touch-sensing display substrate of claim 9, further comprising:
a plurality of first connecting lines arranged along the first direction and disposed in an inter-subpixel region of the touch-sensing display substrate; and
a plurality of second connecting lines arranged along the second direction and disposed in the inter-subpixel region of the touch-sensing display substrate;
wherein a respective one of the plurality of first connecting lines extends along the second direction and is electrically connected to the respective one of the plurality of first touch-sensing electrodes;
the respective one of the plurality of first touch-sensing electrodes is electrically connected to the plurality of second connecting lines;
the plurality of first connecting lines are parallel to a plurality of gate lines;
the plurality of second connecting lines are parallel to a plurality of data lines;
the touch-sensing display substrate further comprises a first insulating layer between the plurality of gate lines and the plurality of data lines;
wherein a respective one of the plurality of second connecting lines extend through the first insulating layer and electrically connects to ends of at least one of the plurality of first connecting lines;
an orthographic projection of the respective one of the plurality of first touch-sensing electrodes on a base substrate at least partially overlaps with an orthographic projection of the at least one of the plurality of first connecting lines electrically connected to the respective one of the plurality of second connecting lines on the base substrate.

11. The touch-sensing display substrate of claim 10, further comprising a second insulating layer between the plurality of data lines and the plurality of first touch-sensing electrodes;
wherein the plurality of second connecting lines respectively extend through the second insulating layer to electrically connect to the plurality of first touch-sensing electrodes.

12. The touch-sensing display substrate of claim 10, further comprising a second insulating layer between the plurality of gate lines and the plurality of first touch-sensing electrodes;
wherein the plurality of first connecting lines respectively extend through the second insulating layer to electrically connect to the plurality of first touch-sensing electrodes.

13. The touch-sensing display substrate of claim 10, wherein multiple lines of the plurality of first connecting lines are electrically connected in parallel to each other; and
multiple lines of the plurality of second connecting lines are electrically connected in parallel to each other.

14. The touch-sensing display substrate of claim 13, wherein the plurality of second touch-sensing sub-electrodes are arranged in array.

15. The touch-sensing display substrate of claim 1, further comprising a plurality of first connecting lines arranged along the first direction and disposed in an inter-subpixel region of the touch-sensing display substrate;
wherein a respective one of the plurality of first connecting lines extends along the second direction and is electrically connected to a corresponding first touch-sensing electrode.

16. The touch-sensing display substrate of claim 15, wherein the plurality of first connecting lines are parallel to a plurality of gate lines; and
the plurality of first connecting lines and the plurality of gate lines are in a same layer and comprise a same material.

17. The touch-sensing display substrate of claim 1, further comprising a plurality of second connecting lines arranged along the second direction and disposed in an inter-subpixel region of the touch-sensing display substrate;
wherein the respective one of the plurality of first touch-sensing electrodes is electrically connected to the plurality of second connecting lines.

18. The touch-sensing display substrate of claim 17, wherein the plurality of second connecting lines are parallel to a plurality of data lines; and
the plurality of second connecting lines and the plurality of data lines are in a same layer and comprise a same material.

19. A touch-sensing display apparatus, comprising a touch-sensing display substrate of claim 1, and one or more integrated circuits connected to the touch-sensing display substrate.

20. A method of fabricating a touch-sensing display substrate, comprising:
forming a plurality of first touch-sensing electrodes arranged along a first direction, a respective one of the plurality of first touch-sensing electrodes extending along a second direction different from the first direction;
forming a plurality of first apertures respectively extending through a thickness of a respective one of the plurality of first touch-sensing electrodes, the plurality of first apertures arranged along the second direction;
a plurality of second apertures respectively extending through of a thickness of the respective one of the plurality of first touch-sensing electrodes, the plurality of second apertures arranged along the second direction; and forming a plurality of signal lines;
wherein a first signal line of the plurality of signal lines is formed to extend along the second direction and crosses over the plurality of first apertures in one of the plurality of first touch-sensing electrodes but not the plurality of second apertures in any first touch-sensing electrode; and
a second signal line of the plurality of signal lines is formed to extend along the second direction and crosses over the plurality of second apertures in a same as or different from the one of the plurality of first touch-sensing electrodes crossed-over by the first signal line, but not the plurality of first apertures in any first touch-sensing electrode.

* * * * *